United States Patent
Tanabe

(10) Patent No.: US 10,157,302 B2
(45) Date of Patent: Dec. 18, 2018

(54) SYMBOL DETECTOR, IMAGE PROCESSING DEVICE, AND SYMBOL DETECTING METHOD

(71) Applicant: FUJITSU LIMITED, Kawasaki-shi, Kanagawa (JP)

(72) Inventor: Satoshi Tanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/350,554

(22) Filed: Nov. 14, 2016

(65) Prior Publication Data

US 2017/0140191 A1 May 18, 2017

(30) Foreign Application Priority Data

Nov. 17, 2015 (JP) ................. 2015-225174

(51) Int. Cl.
| | | |
|---|---|---|
| G06K 5/00 | (2006.01) | |
| G06K 7/14 | (2006.01) | |
| G06K 7/10 | (2006.01) | |
| G06K 19/06 | (2006.01) | |

(52) U.S. Cl.
CPC ....... *G06K 7/1417* (2013.01); *G06K 7/10762* (2013.01); *G06K 7/10851* (2013.01); *G06K 7/10881* (2013.01); *G06K 7/146* (2013.01); *G06K 7/1408* (2013.01); *G06K 2019/06225* (2013.01)

(58) Field of Classification Search
CPC ........... G06K 7/10762; G06K 7/10881; G06K 7/1417; G06K 7/1456; G06K 7/10792; G06K 7/1443; G06K 7/1473; G06K 7/146; G06K 7/1408; G06K 7/10851; G06K 2019/06225

USPC ....................................... 235/462.11
See application file for complete search history.

(56) References Cited

U.S. PATENT DOCUMENTS

| | | | | |
|---|---|---|---|---|
| 6,494,375 | B1 * | 12/2002 | Ishibashi ............ | G06K 7/10732 235/462.11 |
| 2001/0012413 | A1 * | 8/2001 | Longacre, Jr. ..... | G06K 7/10722 382/313 |
| 2003/0222144 | A1 * | 12/2003 | Meier ................. | G06K 7/10574 235/454 |

(Continued)

FOREIGN PATENT DOCUMENTS

| | | |
|---|---|---|
| JP | 5-197830 | 8/1993 |
| JP | 8-315063 | 11/1996 |
| JP | 2006-134303 | 5/2006 |

*Primary Examiner* — Claude J Brown
(74) *Attorney, Agent, or Firm* — Staas & Halsey LLP

(57) ABSTRACT

A symbol detector includes a binarization processor configured to read a symbol image in a uniaxial direction and output a first pixel value or a second pixel value obtained by binarization of a pixel value of each pixel of the symbol image, a calculator configured to calculate a second ratio of a first consecutive value and a second consecutive value obtained before and after the first consecutive value in a case where the first consecutive value and the second consecutive value are switched alternately, and a transmitter configured to output the symbol image in a case where a difference between the calculated second ratio and the first ratio is equal to or lower than a predetermined value, and stop outputting the symbol image in a case where the difference is higher than the predetermined value.

8 Claims, 25 Drawing Sheets

(56) References Cited

U.S. PATENT DOCUMENTS

| | | | | |
|---|---|---|---|---|
| 2004/0020989 A1* | 2/2004 | Muramatsu | ...... | G06K 19/06037 235/462.1 |
| 2007/0071320 A1* | 3/2007 | Yada | .................... | G06K 7/1456 382/181 |
| 2007/0295814 A1* | 12/2007 | Tanaka | ............... | G06K 7/10722 235/454 |
| 2011/0290882 A1* | 12/2011 | Gu | ....................... | G06K 7/1456 235/462.11 |
| 2016/0125214 A1* | 5/2016 | Huang | ............... | G06K 7/10811 235/462.11 |
| 2018/0173918 A1* | 6/2018 | Jiang | ........................ | G06K 7/10 |

* cited by examiner

FIG. 16

|  | LOGOUT | |
|---|---|---|
|  | H LEVEL ("1") | H LEVEL ("0") |
| HREF3 | HREF2 | 0 |
| VSYNC3 | VSYNC2 | 0 |
| DATA3[7:0] | DATA2[7:0] | 0 |
| PCLK3 | PCLK2 | 0 |

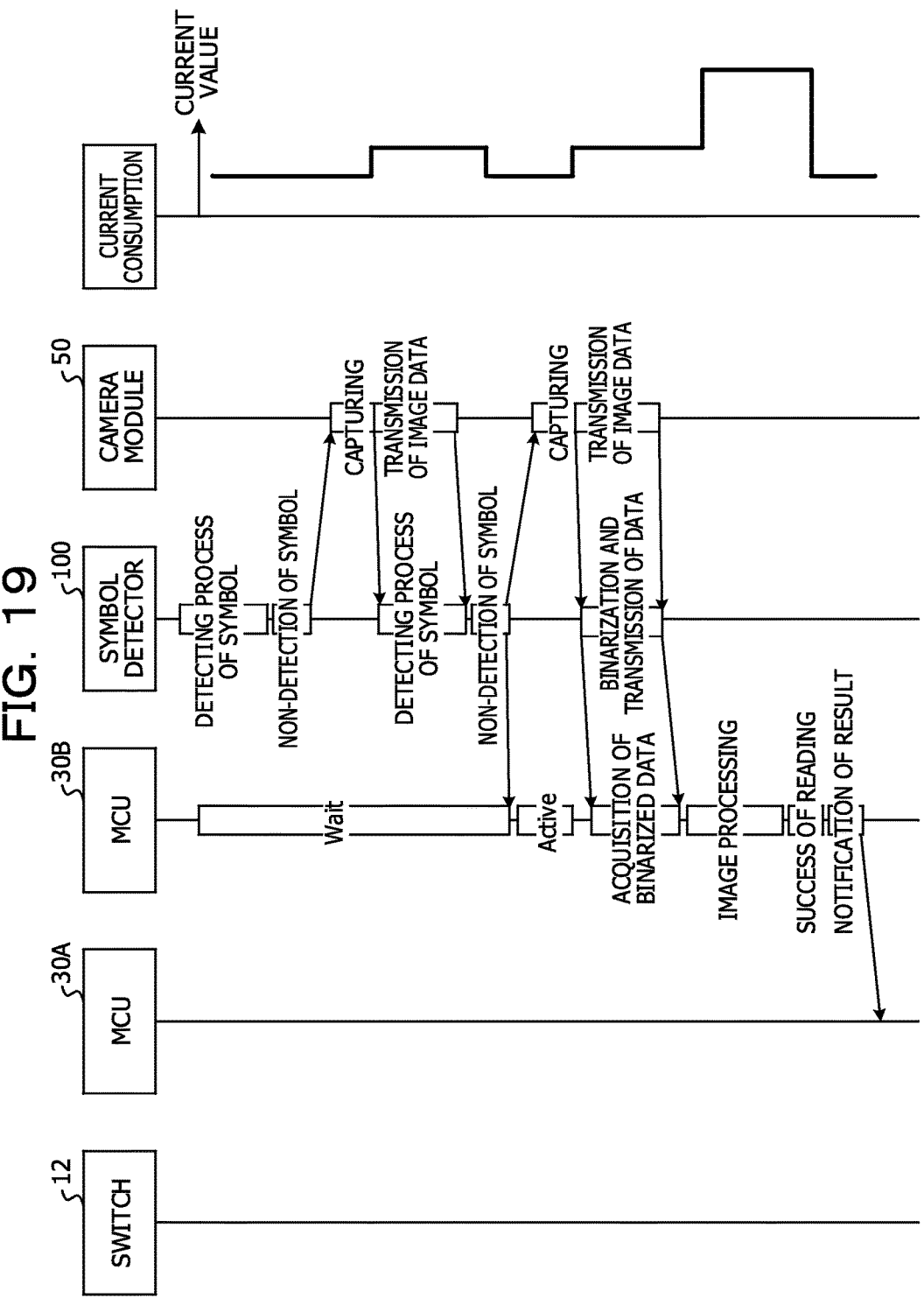

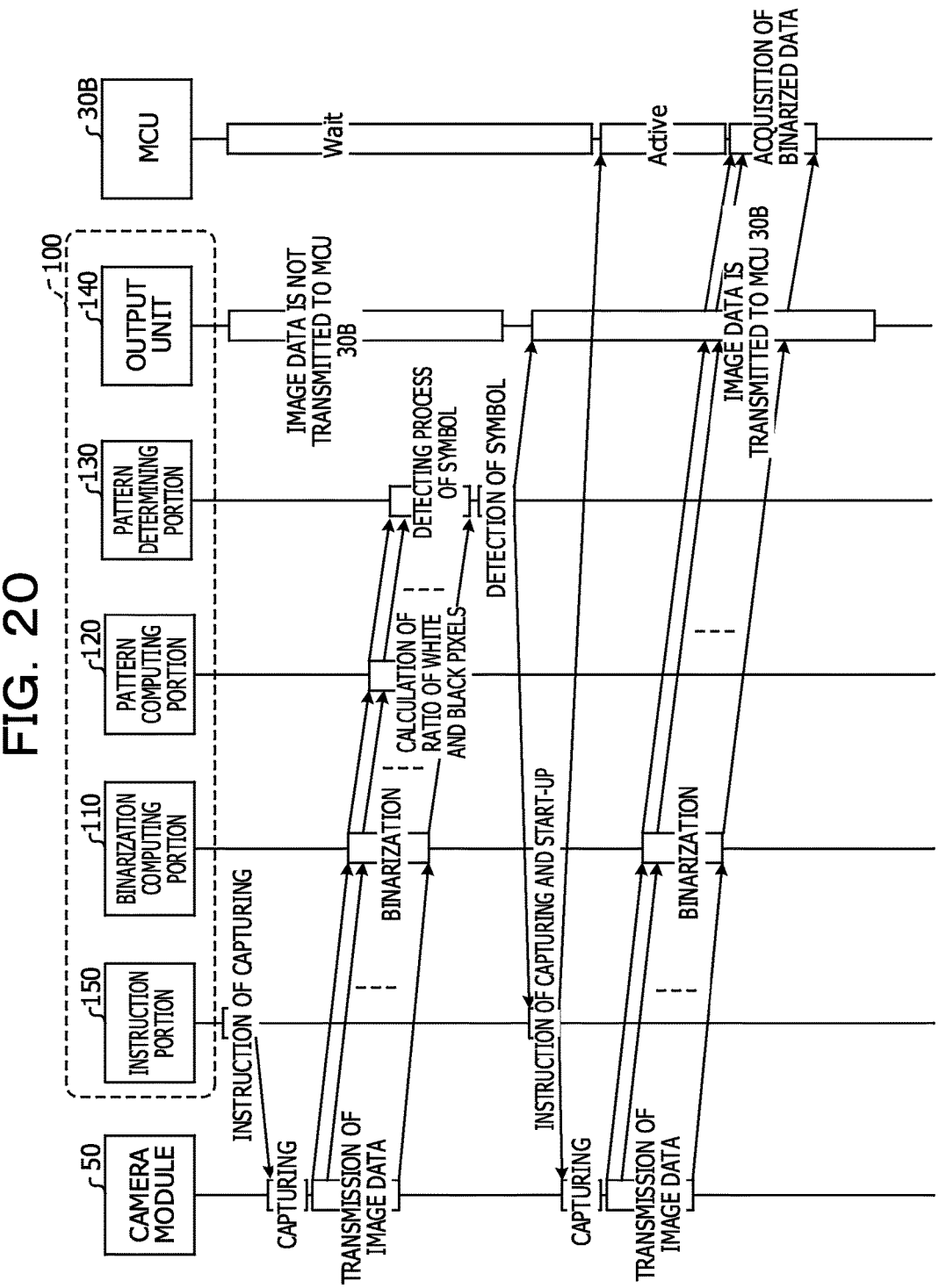

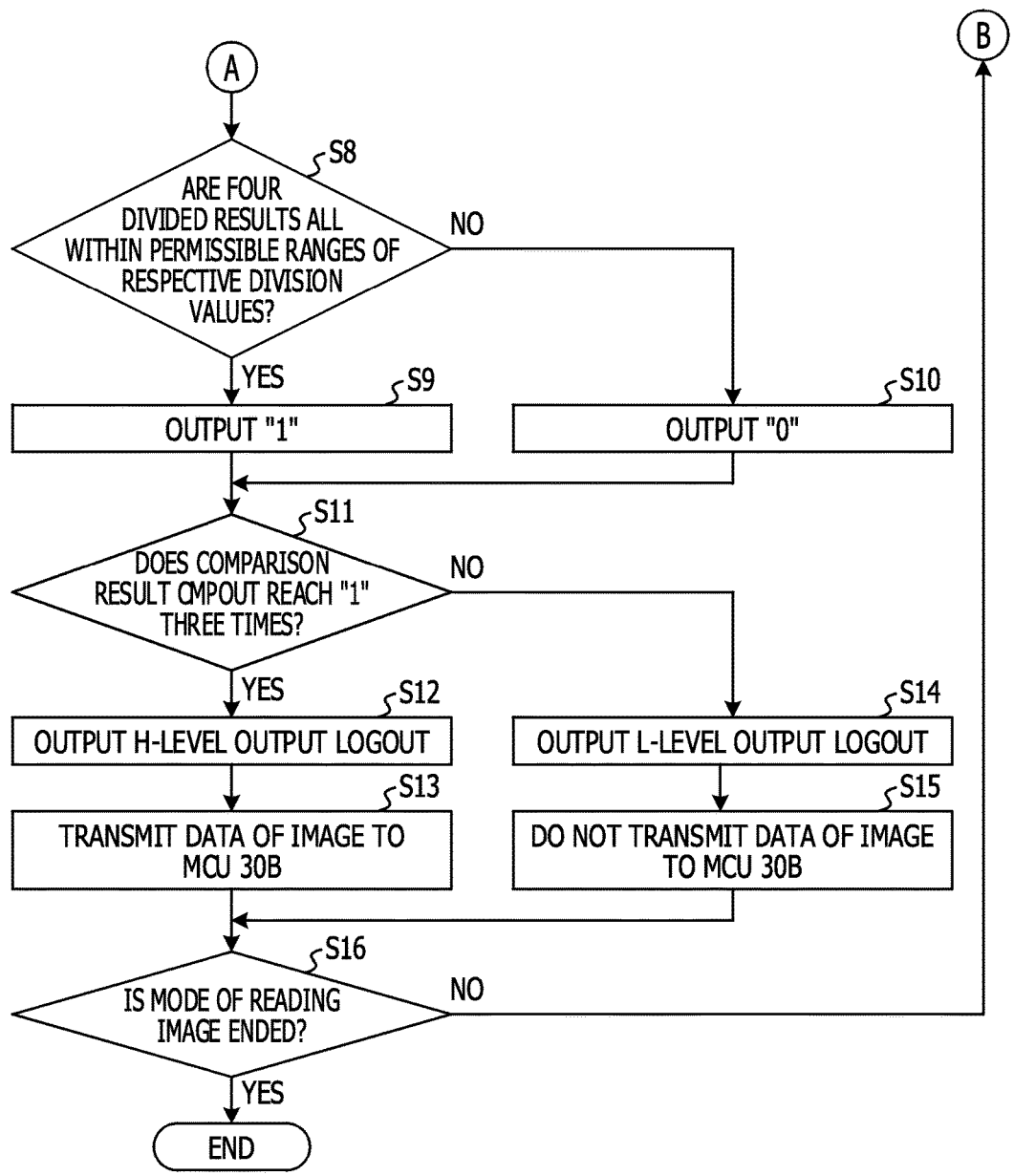

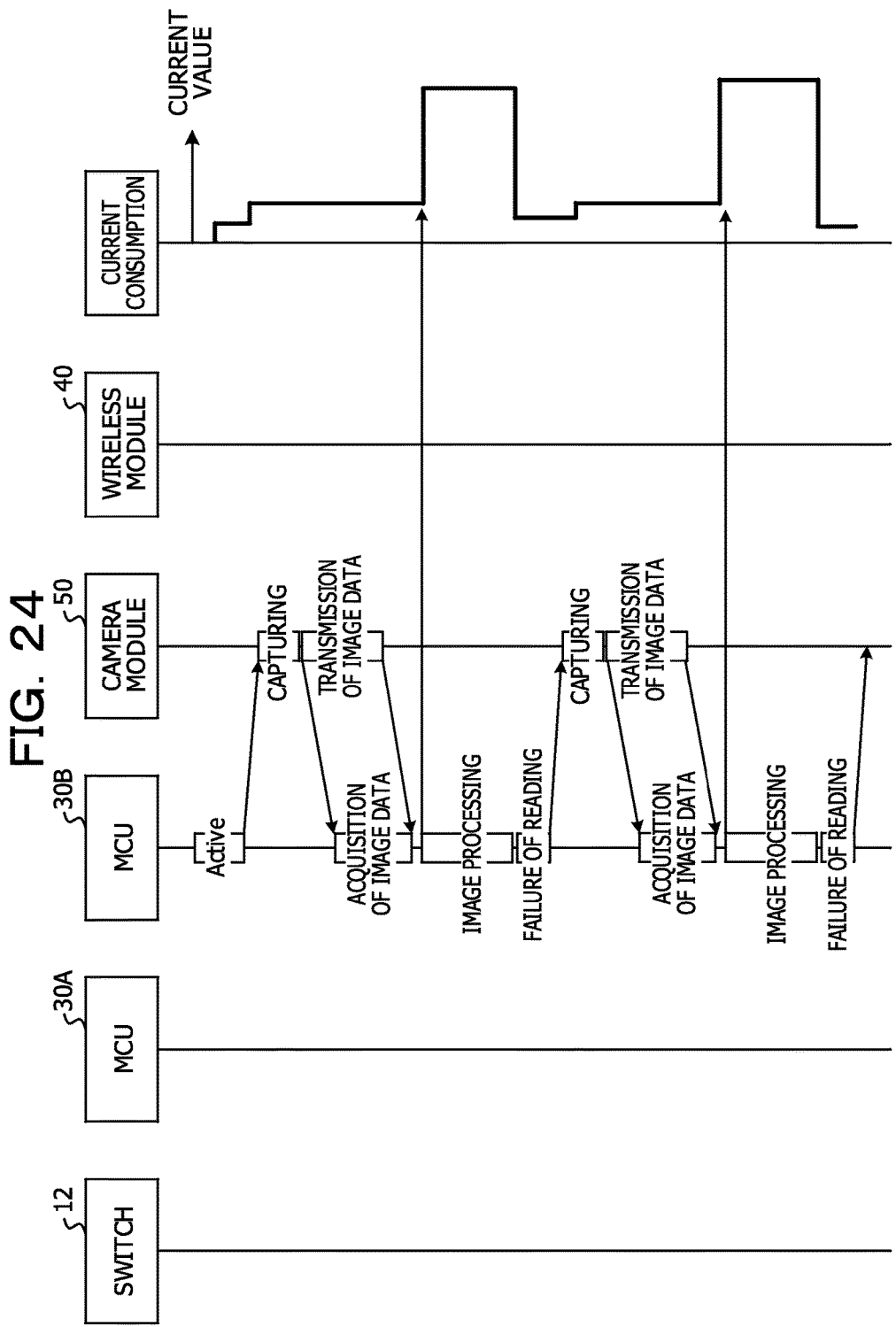

SYMBOL DETECTOR, IMAGE PROCESSING DEVICE, AND SYMBOL DETECTING METHOD

CROSS-REFERENCE TO RELATED APPLICATION

This application is based upon and claims the benefit of priority of the prior Japanese Patent Application No. 2015-225174, filed on Nov. 17, 2015, the entire contents of which are incorporated herein by reference.

FIELD

The embodiment discussed herein is related to a symbol detector, an image processing device, and a symbol detecting method.

BACKGROUND

In the related art, there has been an optical information reader (two-dimensional code reader) that includes a capturing unit which has a two-dimensional capturing field and captures an image of a reading target containing an information code, and a marker-beam irradiating unit which irradiates the reading target with a marker beam so as to mark a reading position on the reading target.

The optical information reader (two-dimensional code reader) includes an approach-detecting unit that detects a relative approach of the information code into the capturing field of the capturing unit, and a reading-operation executing unit that causes the capturing unit to automatically execute a reading operation of the information code, based on the detection by the approach-detecting unit.

The approach-detecting unit has a marker-beam image acquiring unit that captures an image of a reading target by the capturing unit in a state of the irradiation with the marker beam by the marker-beam irradiating unit, and a brightness-pattern detecting unit that detects a brightness pattern in a marker-beam irradiated portion on a marker-beam image captured by the marker-beam image acquiring unit. The approach-detecting unit further has a judgment unit that judges the approach of the information code into the capturing field, based on a change in the brightness pattern in marker-beam images acquired at different timings.

The optical information reader (two-dimensional code reader) has a control circuit that executes a reading control program such that a marker-beam irradiating portion continually performs irradiation (turning-on) with the marker beam (or repeats turning on and off) when power turns on.

The control circuit continuously monitors whether or not the two-dimensional code contained in the reading target relatively approaches the capturing field (reading position marked by the marker beam) of a beam-receiving sensor, and automatically executes the reading operation (operation in which an illumination unit turns on and an image is captured by the beam-receiving sensor 13) of the two-dimensional code when the approach is detected. Japanese Laid-open Patent Publication No. 2006-134303 is known as an example of the related art (see, for example, claim 1 and paragraph [0032] in the specification).

In the optical information reader (two-dimensional code reader) in the related art, the control circuit, which executes the reading control program, automatically executes the irradiation with the marker beam, monitoring of the two-dimensional code, and a reading operation of the two-dimensional code.

Incidentally, the optical information reader (two-dimensional code reader) in the related art does not succeed every time in reading of the two-dimensional code, and, sometimes, the two-dimensional code is not read. However, the control circuit automatically executes such control described above, when the power turns on.

Since the control circuit, which executes the reading control program, is executed by a computer, power consumption is increased. For example, even in a case where the two-dimensional code is not read, power consumption is increased by performing a process of an access to a memory or the like.

SUMMARY

According to an aspect of the invention, a symbol detector includes a binarization processor configured to read a symbol image in a uniaxial direction, the symbol image including a symbol having a first pattern with a first color and a second pattern with a second color, the first pattern has a predetermined ratio to the second pattern, and output a first pixel value or a second pixel value obtained by binarization of a pixel value of each pixel of the symbol image, a calculator configured to calculate a second ratio of a first consecutive value and a second consecutive value obtained before and after the first consecutive value in a case where the first consecutive value and the second consecutive value are switched alternately, the first consecutive value indicating the number of the consecutive first pixel values, the second consecutive value indicating the number of the consecutive second pixel values, and a transmitter configured to output the symbol image in a case where a difference between the calculated second ratio and the first ratio is equal to or lower than a predetermined value, and stop outputting the symbol image in a case where the difference is higher than the predetermined value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a diagram illustrating a truth table representing an operation of the output unit;

FIG. 19 is still another sequence diagram illustrating an operation example of the symbol detector;

FIG. 20 is still another sequence diagram illustrating an operation example of the symbol detector;

FIGS. 21A and 21B are a flowchart illustrating a process performed by the symbol detector;

FIG. 24 is another sequence diagram illustrating an operation example of the barcode reader of the comparative example.

DESCRIPTION OF EMBODIMENT

An object of an aspect of an example is to provide a symbol detector in which power consumption is reduced, an image processing device and a symbol detecting method.

Hereinafter, an embodiment, to which the symbol detector, the image processing device, and the symbol detecting method are applied, will be described.

Embodiment

Figure 1:
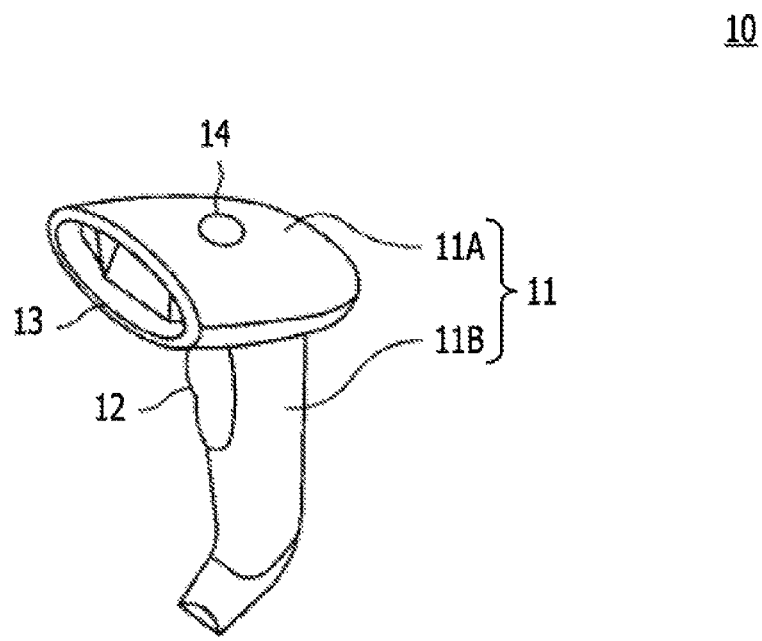
FIG. 1 is a view illustrating a barcode reader including a symbol detector and an image processing device.

FIG. 1 is a view illustrating a barcode reader 10 including the symbol detector and the image processing device of the embodiment.

The barcode reader 10 includes a housing 11, a switch 12, a reading portion 13, and a light emitting diode (LED) 14. The housing 11 has a head 11A and a grip 11B, the reading portion 13 is provided on the front end of the head 11A, and the switch 12 is provided on the grip 11B. The LED 14 is provided on the head 11A.

When a user grips the grip 11B and presses the switch 12 with the reading portion 13 toward a two-dimensional barcode, the reading portion 13 captures an image of the two-dimensional barcode and the barcode reader 10 performs image processing and reads data written in a two-dimensional barcode. The switch 12 is a switch used to generate a trigger that is used when the data is read. The reading portion 13 is a camera module. The LED 14 turns on in a case where the image is out of focus. The case where the image is out of focus also includes a case where the image of the two-dimensional barcode is not correctly read.

Note that the LED 14 may also turn on in a case where the image is in focus. In this case, the LED 14 may have different lighting colors between the case where the image is in focus and the case where the image is out of focus. In addition, the LED 14 may turn on in the case where the image is in focus, instead of turning on in the case where the image is out of focus.

In addition, instead of the LED 14 or in addition to the LED 14, a sound output unit that produces a predetermined sound in the case where the image is out of focus. Such an LED 14 or sound output unit is an example of a notification portion.

Figure 2:
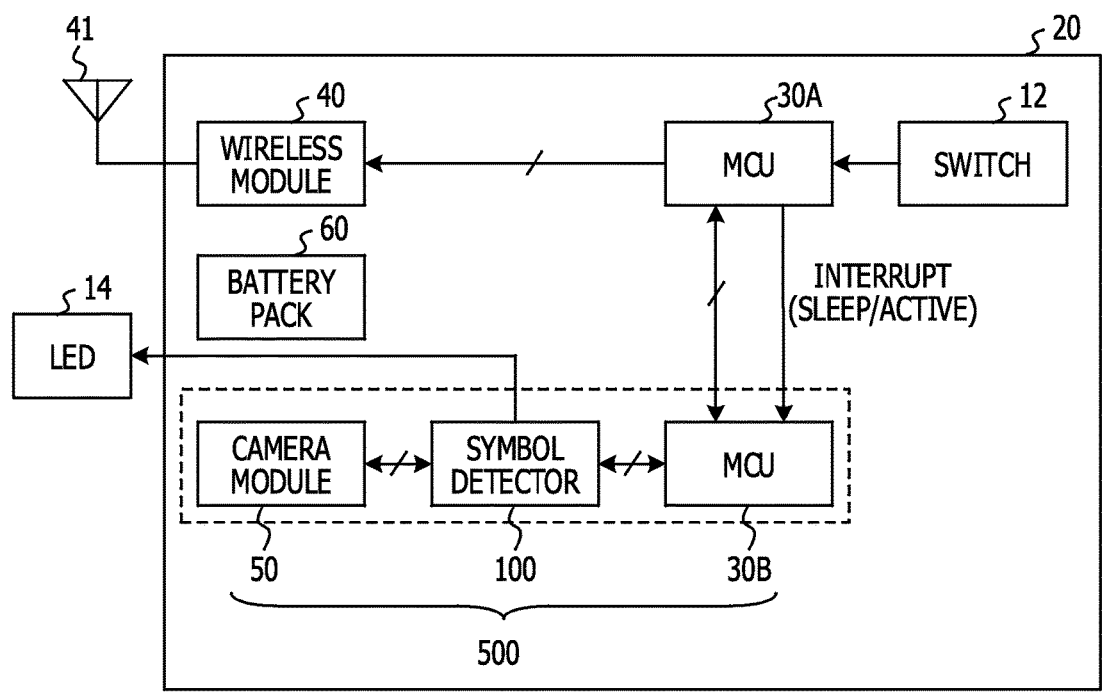
FIG. 2 is a diagram illustrating an internal configuration of the barcode reader of an embodiment.

FIG. 2 is a diagram illustrating an internal configuration of the barcode reader 10 of the embodiment.

The barcode reader 10 includes a board 20, a micro controller unit (MCU) 30A, a MCU 30B, the switch 12, the LED 14, a wireless module 40, an antenna 41, a camera module 50, a battery pack 60, and a symbol detector 100.

Of the components, components (the board 20, the MCU 30A, the MCU 30B, the wireless module 40, the camera module 50, the battery pack 60, and the symbol detector 100) other than the switch 12, the LED 14, and the antenna 41 are disposed inside the housing 11 in FIG. 1. In addition, the LED 14 is not mounted on the board 20, but is attached to the housing 11.

In addition, the MCU 30A, the MCU 30B, the wireless module 40, the camera module 50, and the symbol detector 100 are connected through a bus.

The board 20 is a printed board in the standard of a flame retardant type 4 (FR-4). The MCU 30A, the MCU 30B, the wireless module 40, the camera module 50, and the symbol detector 100 are mounted on the board 20. Power is supplied to the MCU 30A, the MCU 30B, the wireless module 40, the camera module 50, and the symbol detector 100 via wiring formed in the board 20.

In addition, an image processing device 500 is set up with the MCU 30B, the camera module 50, and the symbol detector 100.

The MCU 30A is provided between the MCU 30B and the wireless module 40. In addition, the switch 12 is connected to the MCU 30A. The MCU 30A controls starting of reading of the two-dimensional barcode in response to the switch 12, collectively controls the MCU 30B and the wireless module 40, and the like.

The control of starting of reading of the two-dimensional barcode in response to the switch 12 by the MCU 30A means that the MCU 30A controls output of an active interrupt request signal (interrupt) to the MCU 30B when the switch 12 is pressed and a trigger is generated.

As the collective control of the MCU 30B and by the MCU 30A includes control in which the MCU 30A transmits the interrupt request signal (interrupt) to the MCU 30B and a starting state of the MCU 30B is switched. The MCU 30B is set in a sleep mode, in a case where the interrupt request signal (interrupt) indicates a sleep state, and the MCU 30B is set in the starting state, in a case where the interrupt request signal (interrupt) indicates an active state.

The collective control of the wireless module 40 by the MCU 30A includes a process in which, in a case where the MCU 30B reads data of the two-dimensional barcode and the data is transmitted to the MCU 30A, the transmitted data is transmitted to the wireless module 40 and the wireless module 40 performs transmission from the antenna 41.

Since the MCU 30A is a controller unit that collectively performs operations of the barcode reader 10, power consumption is reduced and a circuit is small in size, compared to the MCU 30B that performs the reading process of the two-dimensional barcode.

The MCU 30B is provided between the MCU 30A and the symbol detector 100. When the two-dimensional barcode is detected by the symbol detector 100, the MCU 30B performs the reading process of the data from the image of the two-dimensional barcode binarized by the symbol detector 100. The MCU 30B is an example of a data reading unit.

In the barcode reader 10, the MCU 30B performs the reading process of the data from the image of the two-dimensional barcode not in a case where the MCU 30B detects the two-dimensional barcode, but in a case where the symbol detector 100 detects the two-dimensional barcode, and the reduction of the power consumption is achieved. The reduction of the power consumption will be described below in detail.

The wireless module 40 is a device that connects the barcode reader 10 and a computer terminal in the wireless communication. The computer terminal is, for example, a terminal for accounting of a retail shop. For example, in a case of using the near field communication such as BLUETOOTH, the wireless module 40 is a modem of the BLUETOOTH.

The antenna 41 is connected to the wireless module 40. The data transmitted from the antenna 41 is transmitted to the computer terminal that is connected to the barcode reader 10 in the wireless communication.

When a power supply of the barcode reader 10 turns on and the switch 12 is pressed, the camera module 50 continually captures images. The camera module 50 is an example of a capturing unit. The camera module 50 is, for example, a camera that captures a color image, and is, for example, a camera that is capable of continually capturing 60 frames for one second.

If the switch is pressed when the barcode reader 10 starts the reading of the two-dimensional barcode, the switch 12 is a switch that generates a trigger. The trigger is input to the MCU 30A.

The battery pack 60 is a DC power source that supplies power to the MCU 30A, the MCU 30B, the wireless module 40, the camera module 50, and the symbol detector 100. Since the barcode reader 10 is a wireless type, the barcode reader operates with the power that is supplied from the battery pack 60.

As the battery pack 60, for example, a secondary battery such as a lithium-ion battery, which is capable of being repeatedly charged, may be used. Since the barcode reader 10 is a wireless type, it is desired that the power consumption of the barcode reader 10 is reduced.

The symbol detector 100 is provided between the MCU 30B and the camera module 50. A computation unit is used as the symbol detector 100. The computation unit is, for example, a programmable logic circuit such as a field programmable gate array (FPGA).

The symbol detector 100 binarizes an image that is input from the camera module 50 and further performs a predetermined process, thereby detecting the two-dimensional barcode contained in the image. In a case where the two-dimensional barcode is detected, the symbol detector 100 binarizes an image in a next frame of the image used in the detection of the two-dimensional barcode and outputs the binarized image to the MCU 30B. Note that the symbol detector 100 causes the LED 14 to turn on in a case where the binarized image is not output to the MCU 30B.

Here, the image in the next frame of the image used in the detection of the two-dimensional barcode is different from an image that is used when the symbol detector 100 detects the two-dimensional barcode, and is an image that is captured by the camera module 50, as the image in the next frame of the image that is used to detect the two-dimensional barcode.

In other words, the image that is used when the symbol detector 100 detects the secondary barcode is different from the image that is used when the MCU 30B reads the data. This is because of the following reasons.

The programmable logic circuit such as the FPGA is used as the symbol detector 100. The programmable logic circuit used as the symbol detector 100 does not have a capacity to the extent that data of images by one frame, which is captured by the camera module 50, may be stored.

Therefore, when the symbol detector 100 ends the detection of the two-dimensional barcode, the data of image by one frame, which is used to detect the two-dimensional barcode does not remain in the symbol detector 100.

In this respect, when the symbol detector 100 detects the two-dimensional barcode, the symbol detector 100 binarizes the image in the next frame, which is captured by the camera module 50 and outputs the binarized image to the MCU 30B.

Note that the camera module 50 performs continual capturing and there is a very high possibility that, similar to the image in the previous frame, a two-dimensional barcode will be contained in the image captured by the camera module 50, as the image in the next frame captured immediately after the symbol detector 100 detects the two-dimensional barcode.

Therefore, in the case where the symbol detector 100 detects the two-dimensional barcode, it may be considered that reading of the data in the two-dimensional barcode is not performed by the MCU 30B although the image in the next frame, which is captured by the camera module 50, is binarized and is output to the MCU 30B.

Figure 3:
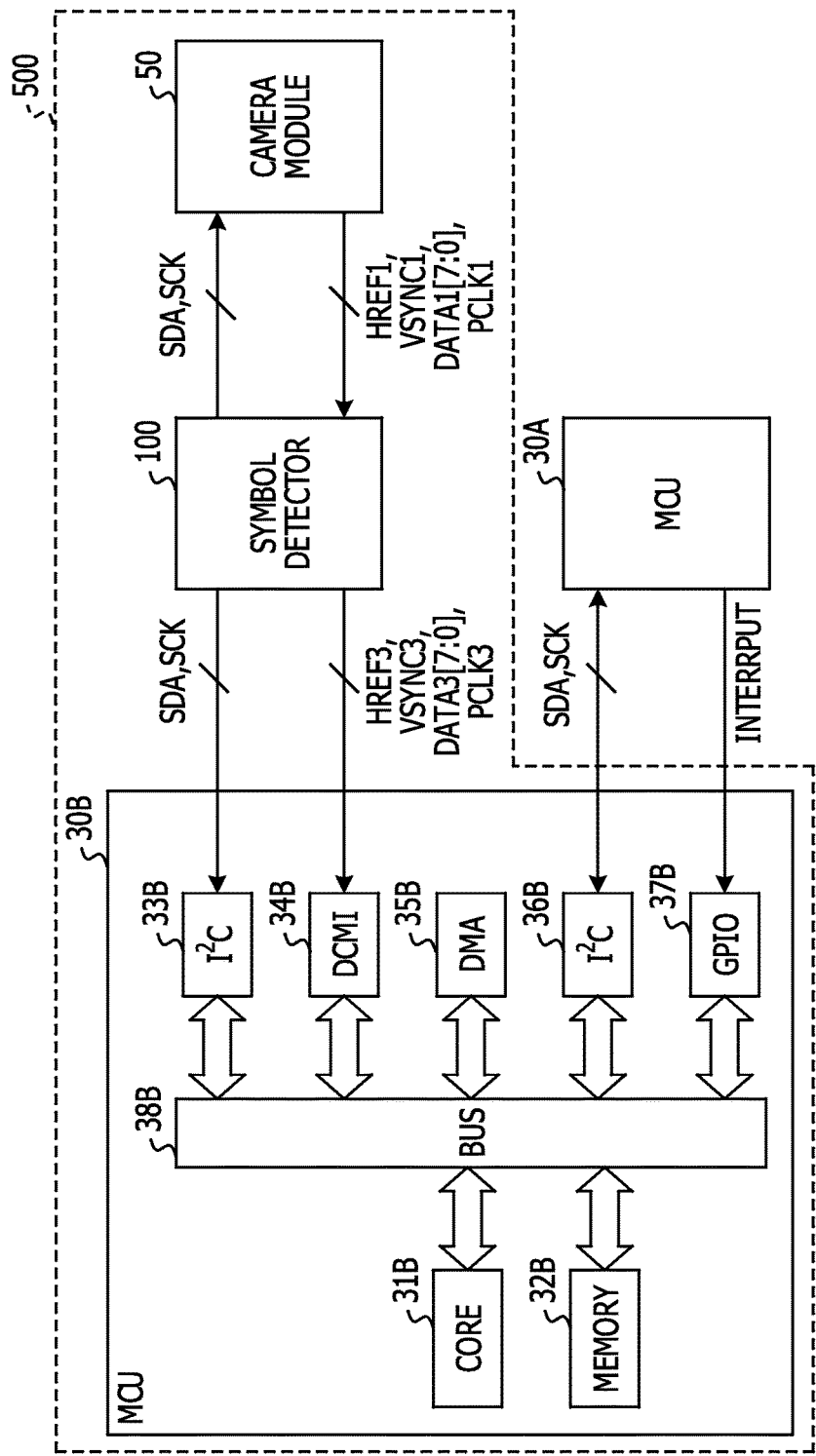
FIG. 3 is a diagram illustrating an MCU, another MCU, a camera module, and the symbol detector, in detail.

FIG. 3 is a diagram illustrating the MCU 30A, the MCU 30B, the camera module 50, and the symbol detector 100, in detail. First, an internal configuration of the MCU 30B is described.

The MCU 30B has a core 31B, a memory 32B, an inter-integrated circuit: I²C 33B, a data center manageability interface (DCMI) 34B, a direct memory access (DMA) 35B, an I²C 36B, a general purpose input/output (GPIO) 37B, and a bus 38B.

The core 31B, the memory 32B, the I²C 33B, the DCMI 34B, the DMA 35B, the I²C 36B, and the GPIO 37B are connected to be capable of communicating with each other by the bus 38B. Note that the DMA 35B is a device through which the camera module 50 directly accesses the memory 32B via the symbol detector 100.

The MCU 30A is connected to the MCU 30B via the I²C 36B and the GPIO 37B. Serial data SDA and serial clock SCK are input from the I²C 36B to the MCU 30A. In addition, the MCU 30A input the interrupt request signal (interrupt) to the GPIO 37B.

Figure 4:
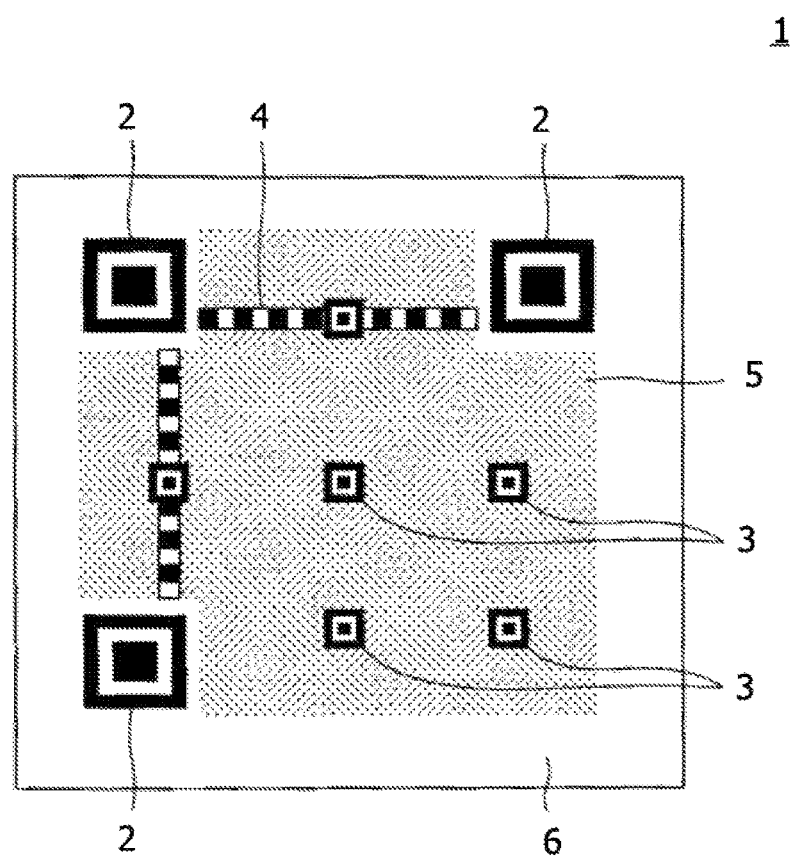
FIG. 4 is a diagram illustrating a two-dimensional barcode that is read by the barcode reader of the embodiment.

The serial data SDA input to the MCU 30A is data indicating a reading result that is transmitted to the MCU 30A when the MCU 30B reads a QR code 1 (refer to FIG. 4).

The symbol detector 100 is connected to the MCU 30B via the I²C 33B and the DCMI 34B. The symbol detector 100 inputs the serial data SDA and the serial clock SCK to the MCU 30B via the I²C 33B. The serial data SDA that is output to the MCU 30B by the symbol detector 100 is a wait signal which is output to the MCU 30B by the symbol detector 100, for example, when the camera module 50 performs the capturing.

In addition, the symbol detector 100 outputs, to the DCMI 34B, a horizontal synchronization signal HREF3, a vertical synchronization signal VSYNC3, data DATA3 [7:0], reference clock PCLK3.

The symbol detector 100 and the camera module 50 are connected via the bus. The symbol detector 100 outputs the serial data SDA and the serial clock SCK to the camera module 50, and receives, from the camera module 50, a horizontal synchronization signal HREF1, a vertical synchronization signal VSYNC1, reference clock PCLK1, and data DATA1 [7:0].

Note that the horizontal synchronization signal HREF1 and the vertical synchronization signal VSYNC1, which are received by the symbol detector 100 from the camera module 50, are a horizontal synchronization signal and a vertical synchronization signal used when the camera module 50 acquires a color image.

In addition, the reference clock PCLK1 is reference clock used when the camera module 50 acquires the color image. In addition, the data DATA1 [7:0] is data of the color image acquired by the camera module 50. The data DATA1 [7:0] is 8-bit data.

In addition, the horizontal synchronization signal HREF3 and the vertical synchronization signal VSYNC3, which are output by the symbol detector 100, are a horizontal synchronization signal and a vertical synchronization signal which are synchronized with the data DATA3 [7:0] of a binarized image, which is output from the symbol detector 100. The reference clock PCLK3 is reference clock used in processing of the data DATA3 [7:0].

FIG. 4 is a diagram illustrating the two-dimensional barcode that is read by the barcode reader 10 of the embodiment. Here, as an example, a method of reading a QR code (registered trademark) is described.

The QR code 1 contains, as an example, a finder pattern 2, an alignment pattern 3, a timing pattern 4, a data region 5, and a quiet zone 6.

The finder pattern 2 is an example of a symbol (code or sign) that is used to detect a position, a size, and a slope of the QR code 1. The QR code 1 illustrated in FIG. 4 contains three finder patterns 2 as an example. The finder pattern 2 may be considered as a mark (imprint, label, or marker) that is used to detect the position, the size, and the slope of the QR code 1.

The alignment pattern 3 is a pattern that is used to correct distortion of the QR code 1. The QR code 1 illustrated in FIG. 4 contains, as an example, four alignment patterns 3. The timing pattern 4 is a pattern that is used to obtain the central coordinate of the QR code 1.

The data region 5 is a region in the QR code 1, in which data is coded and stored. FIG. 4 illustrates the data region 5 in grey. The quiet zone 6 is a margin space that is used to read the QR code 1, and, in FIG. 4, is a white portion on the periphery of the finder patterns 2, the alignment patterns 3, the timing pattern 4, and the data region 5.

Figure 5:
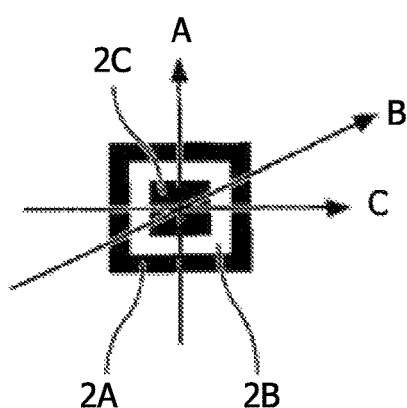
FIG. 5 is a diagram illustrating a finder pattern.
Figure 6:
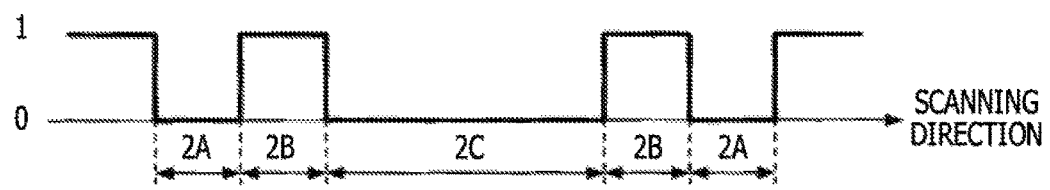
FIG. 6 is a diagram illustrating a reading pattern when the finder pattern is read.

FIG. 5 is a diagram illustrating the finder pattern 2. FIG. 6 is a diagram illustrating a reading pattern obtained when the finder pattern 2 is read.

The finder pattern 2 has a rectangular shape in a plan view, and contains three patterns of a peripheral black pattern 2A having rectangular ring shape, a white pattern 2B on the inner side of the black pattern 2A, and a rectangular black pattern 2C on the inner side of the white pattern 2B. The white pattern 2B is an example of a first pattern and the black patterns 2A and 2C are an example of a second pattern.

Here, in a case where an image obtained by capturing the QR code 1 (refer to FIG. 4) is read per one row, and per one pixel in each row, by a raster scanning method, scanning is performed in directions of arrows A, B, and C illustrated in FIG. 5. The arrows A, B, and C all have straight line shape and all pass through the center of the black pattern 2C.

The reading directions by the raster scanning are, for example, the directions of the arrows A, B, and C, due to angles (rotational angles in an image acquired by a camera) used when the QR code 1 (refer to FIG. 4) is read.

In addition, the arrows A, B, and C indicate only rows that pass the center of the black pattern 2C when the image of the finder pattern 2 is read over a plurality of rows by the raster scanning.

As indicated by the arrows A, B, and C, in a case where the finder pattern 2 is read through the center of the black pattern 2C, the reading is performed through the black pattern 2A, the white pattern 2B, the black pattern 2C, the white pattern 2B, and the black pattern 2A.

Thus, when the finder pattern 2 is read through the center of the black pattern 2C, widths of the black pattern 2A, the white pattern 2B, the black pattern 2C, the white pattern 2B, and the black pattern 2A are set to 1:1:3:1:1.

Hence, when the image obtained by capturing the QR code 1 (refer to FIG. 4) is read by the raster scanning and the reading pattern of 1:1:3:1:1 is obtained, the reading portion 13 is correctly directed to the QR code 1 (refer to FIG. 4) and the image is in focus such that the finder pattern 2 is correctly read.

The horizontal axis in FIG. 6 represents a direction of the raster scanning and distribution of the black patterns 2A, the white patterns 2B, and the black pattern 2C. The vertical axis in FIG. 6 represents a pixel value of each pixel read by the raster scanning. The pixel value obtained in a case where the pixel is black is "0" and the pixel value obtained in a case where the pixel is white is "1".

In the case where the finder pattern 2 is correctly read, as illustrated in FIG. 6, the reading pattern of 1:1:3:1:1 is obtained.

In the barcode reader 10, the symbol detector 100 detects the finder pattern 2. The symbol detector 100 detects the QR code 1 (refer to FIG. 4) by detecting the finder pattern 2.

Figure 7:
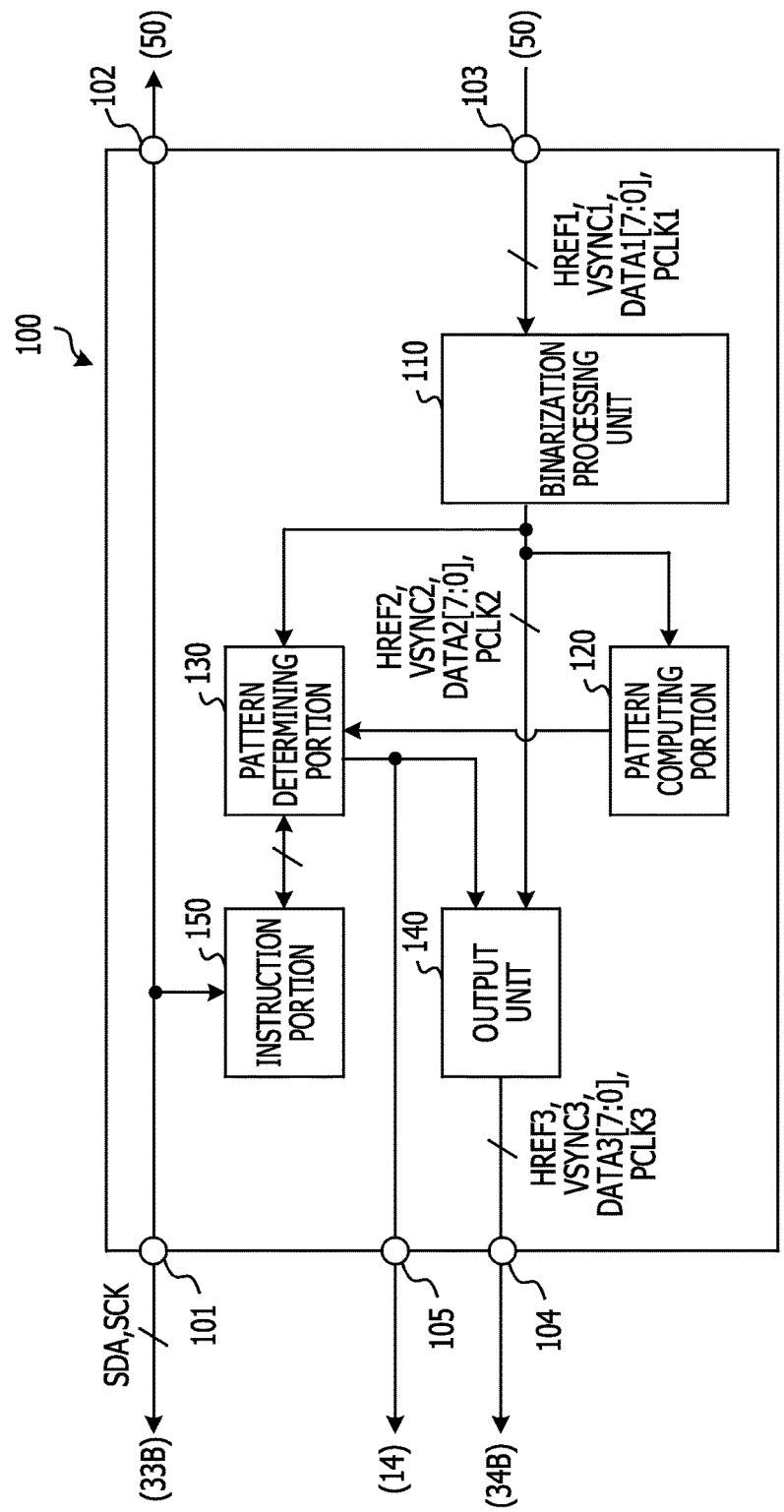
FIG. 7 is a diagram illustrating a configuration of the symbol detector of the barcode reader of the embodiment.

FIG. 7 is a diagram illustrating a configuration of the symbol detector 100 of the barcode reader 10 of the embodiment.

The symbol detector 100 includes a binarization processing unit 110, a pattern computing portion 120, a pattern determining portion 130, an output unit 140, and an instruction portion 150. The symbol detector 100 further includes terminals 101, 102, 103, 104, and 105.

Here, functions of the binarization processing unit 110, the pattern computing portion 120, the pattern determining portion 130, the output unit 140, and the instruction portion 150 are briefly described.

The terminal 101 is a terminal that is connected to the I²C 33B (refer to FIG. 3) and outputs the serial data SDA and the serial clock SCK. The terminal 101 is connected to the instruction portion 150 and the terminal 102 inside the symbol detector 100.

The terminal 102 is a terminal that is connected to the camera module 50 and outputs, to the camera module 50, the serial data SDA and the serial clock SCK which are input from the terminal 101. The terminal 102 is connected to the instruction portion 150 and the terminal 101 inside the symbol detector 100.

The terminal 103 is a terminal which is connected to the camera module 50 and to which the horizontal synchronization signal HREF1, the vertical synchronization signal VSYNC1, the reference clock PCLK1, and the data DATA1 [7:0] are input from the camera module 50. The terminal 103 is connected to the binarization processing unit 110 inside the symbol detector 100.

The terminal 104 is connected to the DCMI 34B. In addition, the terminal 104 is connected to the output unit 140 inside the symbol detector 100. The terminal 104 is a terminal that outputs, to the DCMI 34B, the horizontal synchronization signal HREF3, the vertical synchronization signal VSYNC3, the data DATA3 [7:0], and the reference clock PCLK3 which are output from the output unit 140.

The terminal 105 is connected to the LED 14. In a case where the image binarized by the symbol detector 100 is not output to the MCU 30B, the LED 14 turns on, based on the output from the pattern determining portion 130.

The binarization processing unit 110 binarizes the data DATA1 [7:0] using the horizontal synchronization signal HREF1, the vertical synchronization signal VSYNC1, and the reference clock PCLK1 which are input via the terminal 103.

The data DATA1 [7:0] is data of the color image captured by the camera module 50. Since the camera module 50 reads the image by the raster scanning method, the data DATA1 [7:0] is image data for each pixel, which is read by the raster scanning method. In the binarization, a pixel value of a white pixel is set to "255" and a pixel value of a black pixel is set to "0".

When the data DATA1 [7:0] is binarized, the binarization processing unit 110 may binarize the pixel value contained in the data DATA1 [7:0], using a threshold value of a value closer to "0" without limit.

The binarization processing unit 110 outputs data DATA2 [7:0] indicating an image obtained by binarization of the data DATA1 [7:0], a horizontal synchronization signal HREF2, a vertical synchronization signal VSYNC2, and reference clock PCLK2, to the pattern computing portion 120, the pattern determining portion 130, and the output unit 140.

The horizontal synchronization signal HREF2, the vertical synchronization signal VSYNC2, and the reference clock PCLK2 are obtained by shifting the horizontal synchronization signal HREF1, the vertical synchronization signal VSYNC1, and the reference clock PCLK1 by time taken to perform the binarization process by the binarization processing unit 110 and are used in the process of the data DATA2 [7:0] of the binarized image.

The pattern computing portion 120 is provided on the output side of the binarization processing unit 110, the number of consecutive pixel values ("255" or "0") contained in the data DATA2 [7:0] is counted and a ratio between the numbers of consecutive pixel values is calculated, using the horizontal synchronization signal HREF2, the vertical synchronization signal VSYNC2, the reference clock PCLK2 which are input from the binarization processing unit 110.

The pattern determining portion 130 detects the reading pattern of 1:1:3:1:1, based on the ratio calculated by the pattern computing portion 120. When the pattern determining portion 130 detects the reading pattern of 1:1:3:1:1 three times, the output unit 140 enters a state of being capable of outputting DATA3 [7:0] to the MCU 30B.

DATA2 [7:0] is input to the output unit 140 from the pattern determining portion 130. When the output unit 140 enters the state of being capable of outputting DATA2 [7:0] by the pattern determining portion 130, DATA2 [7:0] is output as the DATA3 [7:0] to the MCU 30B. In a case where the output unit 140 does not enter the state of being capable of outputting DATA2 [7:0] by the pattern determining portion 130, DATA3 [7:0] is not output to the MCU 30B.

The instruction portion 150 performs instruction of capturing to the camera module 50, transmission of the interrupt request signal (interrupt) to the MCU 30B, and the serial data SDA and the serial clock SCK, or the like. The interrupt request signal (interrupt) is an instruction signal causing the MCU 30B to enter an active state or a sleep state. The instruction portion 150 is realized by an I²C.

Next, configurations, functions, and operations of the binarization processing unit 110, the pattern computing portion 120, the pattern determining portion 130, the output unit 140, and the instruction portion 150 are described in detail.

Figure 8:
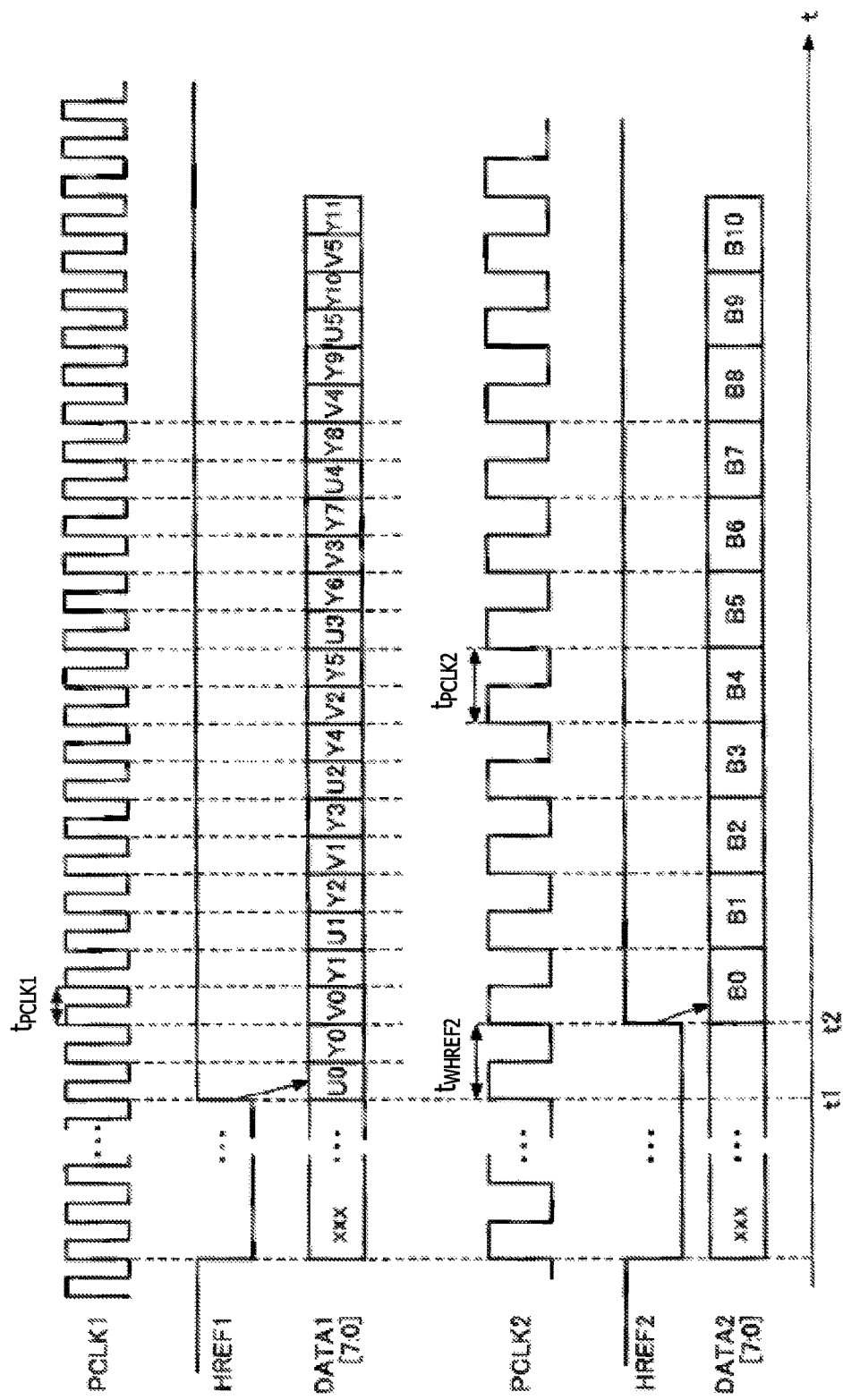
FIG. 8 is a diagram illustrating a timing chart representing an operation of a binarization processing unit.
Figure 9:
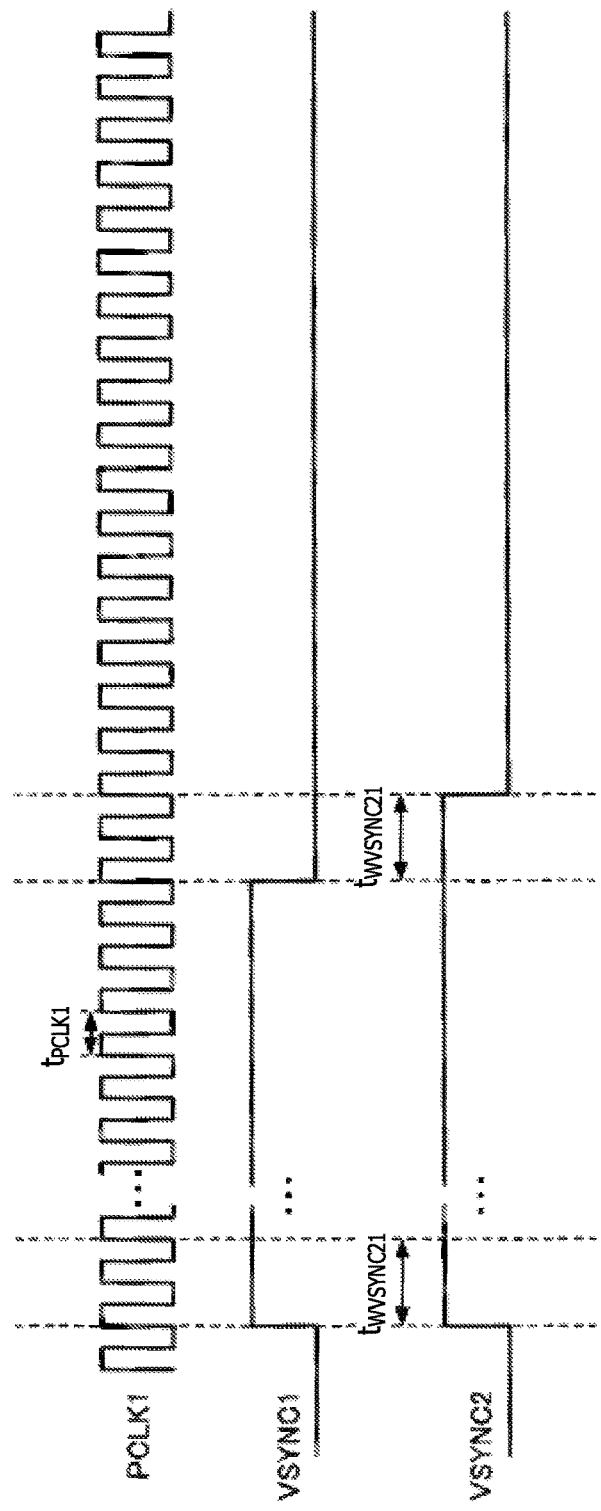
FIG. 9 is a diagram illustrating another timing chart representing an operation of the binarization processing unit.

FIGS. 8 and 9 are diagrams illustrating a timing chart representing the operation of the binarization processing unit 110.

FIG. 8 illustrates the reference clock PCLK1, the horizontal synchronization signal HREF1, the data DATA1 [7:0], the reference clock PCLK2, the horizontal synchronization signal HREF2, and the data DATA2 [7:0]. The vertical axis represents signal levels of the signals and the horizontal axis represents time.

As illustrated in FIG. 8, one cycle of the reference clock PCLK1 is $t_{PCLK1}$. The frequency of the reference clock PCLK1 is, for example, 60 Hz.

The horizontal synchronization signal HREF1 is a signal indicating whether or not horizontal-direction data of the data of the color image acquired (captured) by the camera module 50 is valid. The horizontal synchronization signal HREF1 has a high (H) level when there is data in the pixel, and has a low (L) level when there is no data in the pixel.

Since the camera module 50 reads the image by the raster scanning method, the horizontal synchronization signal HREF1 has the L level whenever one row is read in the horizontal direction. In other words, the horizontal synchronization signal HREF1 has the L level when rows of the data of the image are switched.

When the horizontal synchronization signal HREF1 has the H level at a time point t1, a value of data DATA1 [7:0] is obtained. FIG. 8 illustrates the data DATA1 [7:0] obtained in a case of YUV 422. In the case of the YUV 422, data of Yi representing luminance and one of Ui or Vi representing a color difference are obtained during the one cycle of the reference clock PCLK1. Note that i is a number in consecutive numbers (a natural number of 0 or higher) from 0 and is assigned each of the luminance Yi, the color difference Ui, and the color difference Vi.

A cycle $t_{PCLK2}$ of the reference clock PCLK2 is set to twice the cycle $t_{PCLK1}$ of the reference clock PCLK1. In other words, $t_{PCLK2} = t_{PCLK1} \times 2$. The binarization processing unit 110 divides the reference clock PCLK1 and generates the reference clock PCLK2. Therefore, the binarization processing unit 110 has a clock divider that divides the reference clock PCLK1.

The horizontal synchronization signal HREF2 is output by applying offset time $t_{WFREF2}$ to the horizontal synchronization signal HREF1 in the binarization processing unit 110. The offset time $t_{WFREF2}$ may be equal to or longer than twice the cycle $t_{PCLK1}$ of the reference clock PCLK1. In other words, $t_{WFREF2} \geq t_{PCLK1}$. Therefore, the binarization processing unit 110 includes a phase shifter that offsets a phase of the horizontal synchronization signal HREF1.

FIG. 8 illustrates the horizontal synchronization signal HREF2 obtained in a case where $t_{WFREF2} = t_{PCLK1} \times 2$. The offset time $t_{WFREF2}$ is applied to the horizontal synchronization signal HREF2 in consideration of time taken to process the binarization of the data DATA1 [7:0] in the binarization processing unit 110.

Therefore, the horizontal synchronization signal HREF2 rises at a time point t2 delayed by the offset time $t_{WFREF2}$ from the time point t1, the data DATA2 [7:0] of the binarized image starts to be read.

Values B0, B1, B2, B3, . . . , B9, and B10, of the data DATA2 [7:0] represent pixel values obtained by performing binarization of luminance Y0, Y1, Y2, Y3, . . . , Y9, and Y10, of the data DATA1 [7:0], respectively. The binarized pixel values are "255" in the case of white and "0" in the case of black. The binarized pixel values are represented by two values of "255" (white) and "0" (black).

FIG. 9 illustrates the reference clock PCLK1, the vertical synchronization signal VSYNC1, and the vertical synchronization signal VSYNC2. The vertical axis represents the signal levels of the signals and the horizontal axis represents time.

The vertical synchronization signal VSYNC1 is a signal having the L level whenever the camera module 50 acquires (captures) an image in one frame. The vertical synchronization signal VSYNC1 has the H level while the camera module 50 acquires the image in one frame.

The vertical synchronization signal VSYNC2 is output by applying offset time $t_{WVSYNC21}$ to the vertical synchronization signal VSYNC1 in the binarization processing unit 110. The offset time $t_{WVSYNC21}$ may be equal to or longer than the offset time $t_{wfref2}$. In other words, $t_{Wvsync21} \geq t_{WFREF2}$. The binarization processing unit 110 applies the offset time $t_{Wvsync21}$ to the vertical synchronization signal VSYNC1 in the phase shifter inside the binarization processing unit.

FIG. 9 illustrates the vertical synchronization signal VSYNC2 obtained in a case where $t_{WFREF2} = t_{PCLK1} \times 2$. The offset time $t_{WVSYNC21}$ is applied to the vertical synchronization signal VSYNC2 in consideration of time taken to process the binarization of the data DATA1 [7:0] in the binarization processing unit 110.

As described above, the binarization processing unit 110 generates and outputs, to the pattern computing portion 120, the pattern determining portion 130, and the output unit 140, the horizontal synchronization signal HREF2, the vertical synchronization signal VSYNC2, the reference clock PCLK2, and the data DATA2 [7:0]. The binarization processing unit 110 includes the clock divider and the phase shifter.

Figure 10:
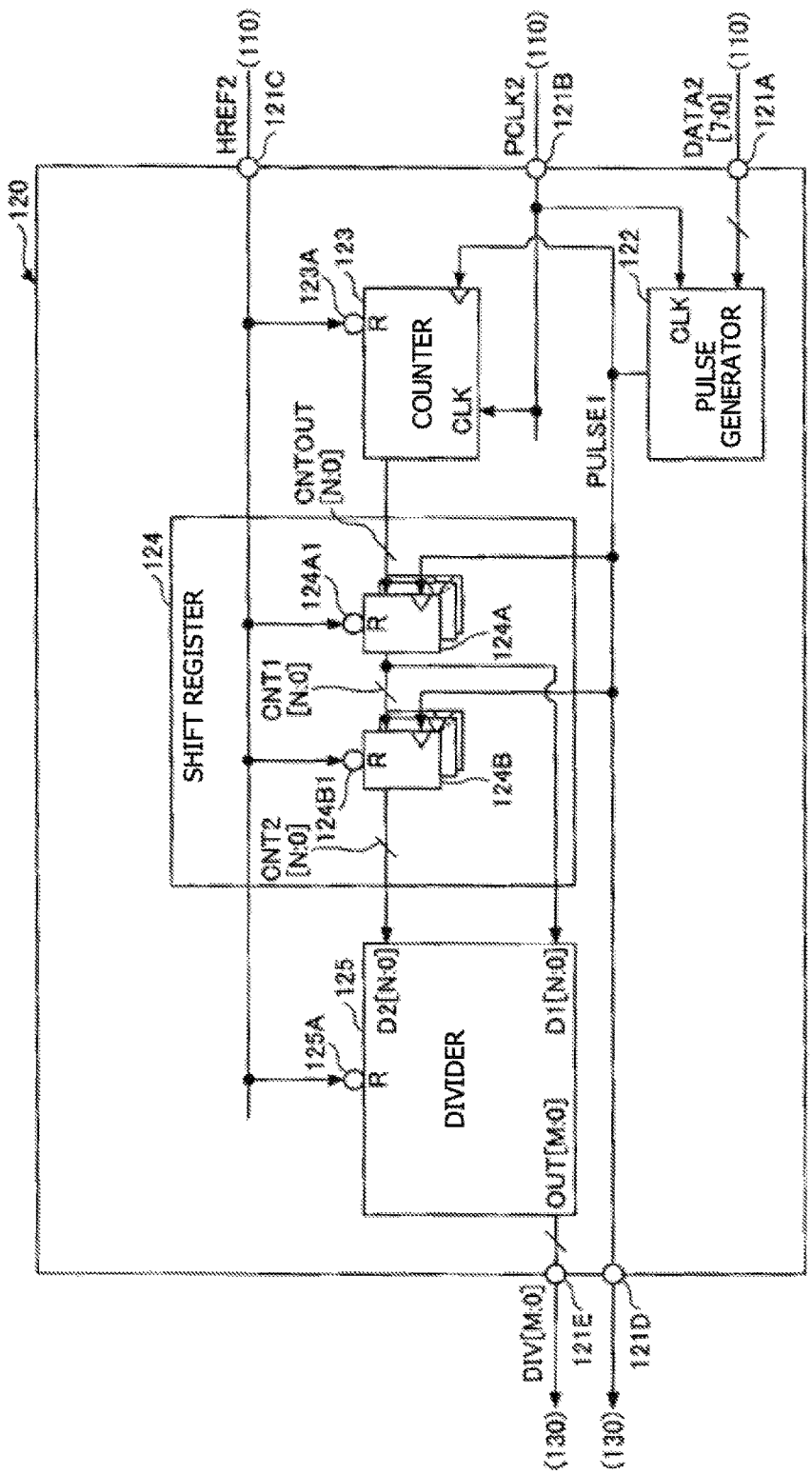
FIG. 10 is a diagram illustrating a pattern computing portion.

FIG. 10 is a diagram illustrating the pattern computing portion 120.

The pattern computing portion 120 includes terminals 121A, 121B, 121C, 121D, and 121E, a pulse generator 122, a counter 123, a shift register 124, and a divider 125. Of the terminals 121A, 121B, 121C, 121D, and 121E, the (M+1) terminals 121A and 121E are provided. The number of (M+1) is the same number of bits of divided results DIV [M:0] to be described below. Note that each of the terminals other than the terminals 121A and 121E is provided by one.

The terminal 121A is a terminal which is connected to the binarization processing unit 110 and to which the data DATA2 [7:0] is input. The terminal 121A is connected to the pulse generator 122 inside the pattern computing portion 120. The data DATA2 [7:0] is input to the pulse generator 122 via the terminal 121A.

The terminal 121B is a terminal which is connected to the binarization processing unit 110 and to which the reference clock PCLK2 is input. The terminal 121B is connected to input terminals (CLK) of the pulse generator 122 and the counter 123 inside the pattern computing portion 120. The reference clock PCLK2 is input to the input terminals (CLK) of the pulse generator 122 and the counter 123 via the terminal 121B.

The terminal 121C is a terminal which is connected to the binarization processing unit 110 and to which the horizontal synchronization signal HREF2 is input. The terminal 121C is connected to a reset terminal R of the counter 123 and reset terminals R of FFs 124A and 124B of the shift register 124 via an inversion element 123A and inversion elements 124A1 and 124B1, respectively, inside the pattern computing portion 120.

The horizontal synchronization signal HREF2 is inverted in the inversion elements 123A, 124A1, and 124B1 via the terminal 121C and is input to the reset terminals R of the counter 123 and the FFs 124A and 124B.

The terminal 121D is connected to the pattern determining portion 130 and is connected to an output terminal of the pulse generator 122 inside the pattern computing portion 120. A pulse PULSE1, which is generated by the pulse generator 122, is output to the pattern determining portion 130 via the terminal 121D.

The (M+1) terminals 121E are each connected to the pattern determining portion 130. The terminal 121E is connected to an output terminal (OUT [M:0]) of the divider 125 inside the pattern computing portion 120. The divided results DIV [M:0], which is output from the divider 125, is output to the pattern determining portion 130 via the terminal 121E.

The pulse generator 122 generates and outputs the pulse PULSE1, based on the data DATA2 [7:0] that is input from the terminal 121A, and the reference clock PCLK2 that is input from the terminal 121B.

When the values ("255" and "0") of the data DATA2 [7:0] are switched, the pulse generator 122 generates the pulse PULSE1 having the H level over a period of one cycle of the reference clock PCLK2. In other words, when the binarized data DATA2 [7:0] switch from black to white, or from white to black, the pulse generator 122 generates the pulse PULSE1. Thus, the pulse PULSE1 is maintained at the L level except for the time when the pulse PULSE1 has the H level.

The pulse PULSE1 generated by the pulse generator 122 is input to a clock input terminal of the counter 123, and clock input terminals of the flip flops (FFs) 124A and 124B of the shift register 124, and is output to the pattern determining portion 130 via the terminal 121D.

Note that the data DATA2 [7:0] represents a pixel value of a binarized image. The pixel value represented by the data DATA2 [7:0] is "255" (white) or "0" (black). In other words, eight bit values are all "1" when the data DATA2 [7:0] is "255", and eight bit values are all "0" when the data DATA2 [7:0] is "0". Therefore, any bit value of the 8-bit data DATA2 [7:0] may be input to the pulse generator 122, instead of the data DATA2 [7:0]. Even in such a configuration, similarly, the pulse generator 122 is capable of generating the pulse PULSE1.

The counter 123 counts frequencies of the reference clock PCLK2 and outputs a count value CNTOUT [N:0].

The count value CNTOUT [N:0] of the counter 123 is reset when the pulse PULSE1, which is input to a clock input terminal from the pulse generator 122, has the H level, or when an inversed value, which is input to the reset terminal R by inverting the horizontal synchronization signal HREF2 in the inversion element 123A, has the H level.

The count value CNTOUT [N:0] output from the counter 123 is output to the FF 124A of the shift register 124.

Note that the count value CNTOUT [N:0] is N+1-bit data, and a value of N+1 may be set to a value obtained by adding a predetermined margin value to the maximum value of consecutive black pixels or white pixels in the QR code 1 (refer to FIG. 4).

The shift register 124 includes (N+1) FFs 124A and (N+1) FFs 124B. The FF 124A is an example of a first storage unit and the FF 124B is an example of a second storage unit.

The number (N+1) of the FFs 124A and 124B is equal to the bit number of the count value CNTOUT [N:0]. Connection relationships between the (N+1) FFs 124A are all the same. The same is true of the (n+1) FFs 124B.

An output terminal of the counter 123 is connected to a data input terminal of the FF 124A, and the counter value CNTOUT [N:0] is input from the counter 123 to the data input terminal. In addition, the output terminal of the pulse generator 122 is connected to a clock input terminal of the FF 124A, and the pulse PULSE1 is input to the clock input terminal. The same is true of all of the (N+1) FFs 124A.

The terminal 121C is connected to the reset terminal R of the FF 124A via the inversion element 124A1. The same is true of all of the (N+1) FFs 124A. In addition, the data output terminals of the (N+1) FFs 124A are connected to the data input terminals of the (N+1) FFs 124B and to the (N+1) data input terminals D1 [N:0] of the divider 125, respectively.

The data output terminals of (N+1) FFs 124A are connected to the data input terminals of the (N+1) FFs 124B, respectively. In addition, the output terminal of the pulse generator 122 is connected to the clock input terminal of the FF 124B, and the pulse PULSE1 is input to the clock input terminal. The same is true of the (N+1) FFs 124B.

The terminal 121C is connected to the reset terminal R of the FF 124B via the inversion element 124B1. The same is true of all of the (N+1) FFs 124B. In addition, the data output terminals of the (N+1) FFs 124B are connected to the (N+1) data input terminals D2 [N:0] of the divider 125.

The shift register 124 stores values of the data input terminals of the FFs 124A and 124B, then, the values of the data input terminals of the FFs 124A are reflected (shifted) to the data input terminals of the FFs 124B, and are output to the data input terminals D1 [N:0] of the divider 125 whenever the pulse PULSE1 is input.

Here, since the count values, which are output from the FFs 124A and 124B, are distinguished, the count value, which is output from the FF 124A, is referred to as CNT1 [N:0], and the count value, which is output from the FF 124B, is referred to as CNT2 [N:0]. The count value CNT1 [N:0] and the count value CNT2 [N:0] represent the number of consecutive pixel values ("255" or "0") contained in the data DATA2 [7:0]. The count value CNT1 [N:0] is an example of first consecutive-pixel values or second consecutive-pixel values, and the count value CNT2 [N:0] is an example of the second consecutive-pixel values or the first consecutive-pixel values.

In addition, in the FFs 124A and 124B, the horizontal synchronization signal HREF2 has the L level, and the value of the data input terminal is reset when a signal having the H level is input to the reset terminal R.

The divider 125 has the data input terminals D1 [N:0] and D2 [N:0], the reset terminal R, and the data output terminal OUT [M:0]. The divider 125 is an example of a calculation unit.

The data output terminals of the (N+1) FFs 124A and the data output terminals of the (N+1) FFs 124B are connected to the data output terminals D1 [N:0] and D2 [N:0], respectively.

In addition, the binarization processing unit 110 is connected to the reset terminal R via the inversion element 125A such that the horizontal synchronization signal HREF2 is inverted and input to the reset terminal. The data output terminal OUT [M:0] is connected to the pattern determining portion 130.

The divider 125 is reset when the inverted value of the horizontal synchronization signal HREF2 reaches the H level. In other words, when the reading in the horizontal direction by the raster scanning is ended (when the reading of pixels in each row is ended), the divider 125 is reset by an L-level inverted value of the horizontal synchronization signal HREF2.

When the divider 125 is reset, the count value CNT1 [N:0], which is input to the data input terminal D1 [N:0], is divided by the count value CNT2 [N:0], which is input to the data input terminal D2 [N:0], and the divided result DIV [M:0] is output from the data output terminal OUT [M:0].

Whenever the count value CNT1 [N:0] which is input to the data input terminal D1 [N:0] and the count value CNT2 [N:0] which is input to the data input terminal D2 [N:0] are switched to each other, the divider 125 outputs the divided result DIV [M:0] to the pattern determining portion 130 from the data output terminal OUT [M:0].

Note that the divided result DIV [M:0] is M+1-bit data and a value of M+1 may be set to a value obtained by adding the predetermined margin value to the maximum value of divided results obtained by dividing values (count values) which are input to the data input terminal D1 [N:0] by values (count values) which are input to the data input terminal D2 [N:0].

Figure 11:
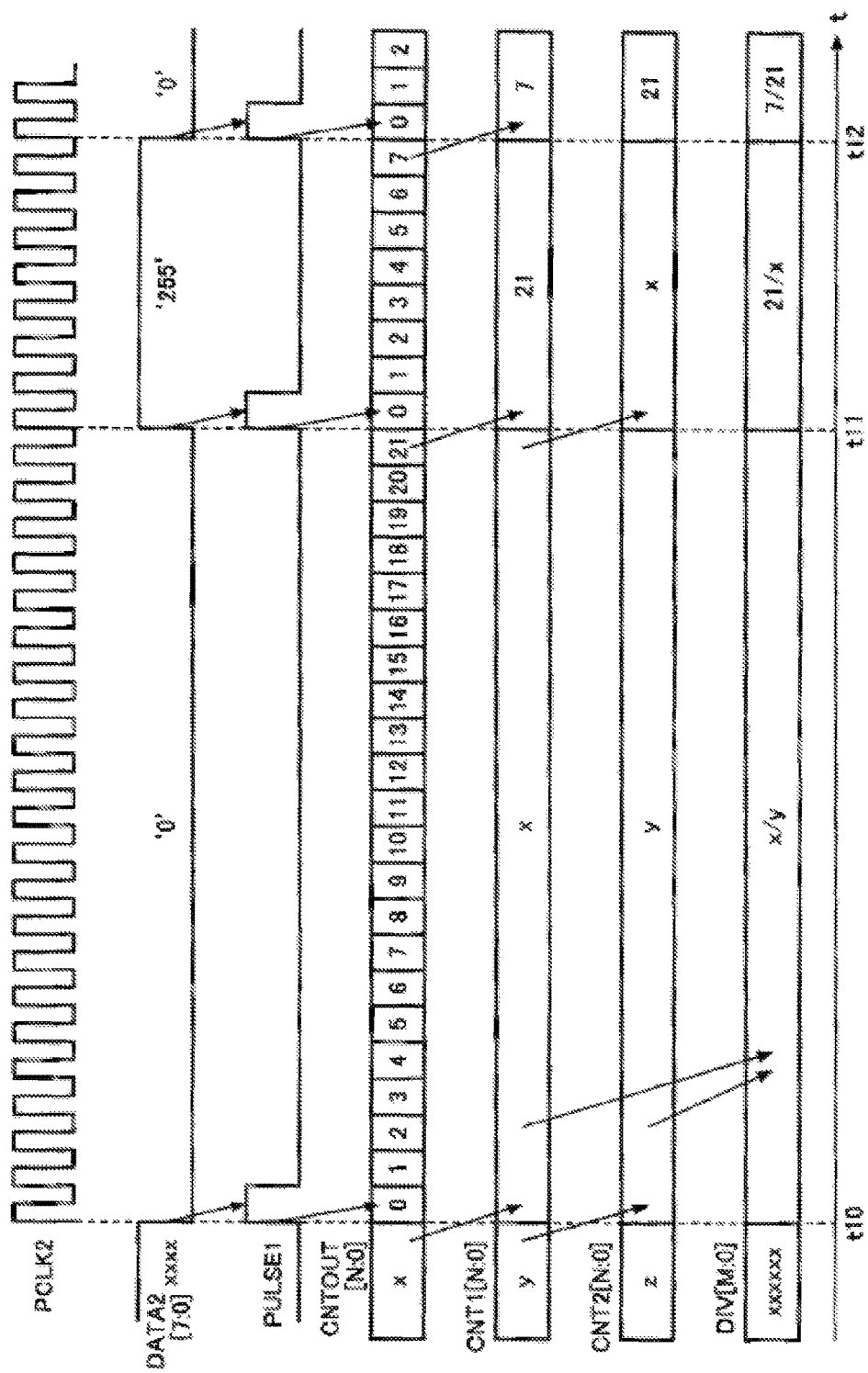
FIG. 11 is a diagram illustrating a timing chart representing an operation of the pattern computing portion.

FIG. 11 is a diagram illustrating a timing chart representing an operation of the pattern computing portion 120. FIG. 11 illustrates the reference clock PCLK2, the data DATA2 [7:0], the pulse PULSE1, the count value CNTOUT [N:0], the count value CNT1 [N:0], the count value CNT2 [N:0], and the divided result DIV [M:0]. In FIG. 11, the vertical axis represents signal levels of the signals and the horizontal axis represents time.

When the data DATA2 [7:0] is set to "0" from an undefined (xxxx) state at a time point t10, the pulse PULSE1 reaches the H level over a period of one cycle of the clock PCLK2, and the counter 123 starts counting.

In an operational example in FIG. 11, until the data DATA2 [7:0] is switched from "0" (black) to "255" (white) at a time point t11, the count value CNT1 [N:0] of the counter 123 is "21" as a decimal.

In addition, immediately before the time point t10, the count value CNTOUT [N:0] is x, the count value CNT1 [N:0] is y, the count value CNT2 [N:0] is z, and the divided result DIV [M:0] is undefined (xxxx). Between the time point t10 to the time point t11, the count value CNT1 [N:0] is switched to x, the count value CNT2 [N:0] is switched to y, and the divided result DIV [M:0] is switched to x/y.

When the data DATA2 [7:0] is switched from "0" (black) to "255" (white) at the time point t11, the pulse PULSE1 reaches the H level over the period of the one cycle of the clock PCLK2, and counting is started after the counter 123 is reset.

Until the data DATA2 [7:0] is switched from "255" (white) to "0" (black) from the time point t11 to the time point t12, the count value CNT1 [N:0] of the counter 123 is "7" as a decimal.

In addition, between the time point t11 to the time point t12, the count value CNT1 [N:0] is 21, the count value CNT2 [N:0] is switched to x, and the divided result DIV [M:0] is switched to 21/x.

Until the data DATA2 [7:0] is switched from "255" (white) to "0" (black) at the time point t12, the pulse PULSE1 reaches the H level over the period of the one cycle of the clock PCLK2, and the counter 123 is reset such that the counting is started.

During transition to the time point t12, the count value CNT1 [N:0] is switched to 7, the count value CNT2 [N:0] is switched to 21, and the divided result DIV [M:0] is switched to 7/21.

Figure 12:
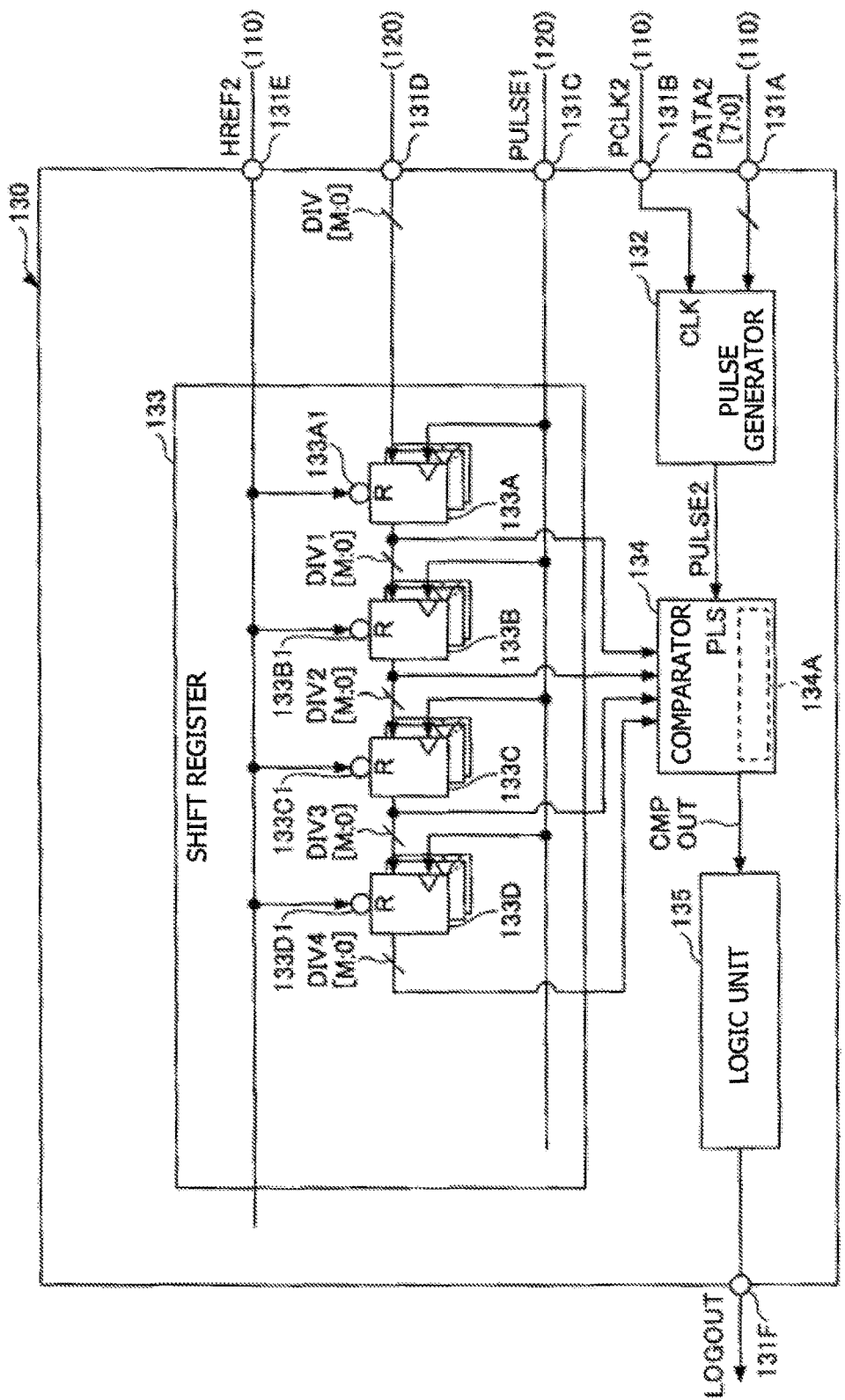
FIG. 12 is a diagram illustrating a pattern determining portion.

FIG. 12 is a diagram illustrating the pattern determining portion 130.

The pattern determining portion 130 includes terminals 131A, 131B, 131C, 131D, 131E, and 131F, a pulse generator 132, a shift register 133, and a comparator 134, and a logic unit 135. Of the terminals 131A, 131B, 131C, 131D, 131E, and 131F, the (M+1) terminals 131A and 131D are provided. Each of the terminals other than the terminals 131A and 131D is provided by one.

The (M+1) terminals 131A are provided to be connected to the binarization processing unit 110. The terminal 131A is a terminal to which the data DATA2 [7:0] is input. The terminal 131A is connected to the pulse generator 132 inside the pattern determining portion 130. The data DATA2 [7:0] is input to the pulse generator 132 via the terminal 131A.

The terminal 131B is a terminal which is connected to the binarization processing unit 110 and to which the reference clock PCLK2 is input. The terminal 131B is connected to an input terminal (CLK) of the pulse generator 132 inside the pattern determining portion 130. The reference clock PCLK2 is input to the input terminal (CLK) of the pulse generator 132 via the terminal 131B.

The terminal 131C is connected to the terminal 121D (refer to FIG. 10) of the pattern computing portion 120. The terminal 131C is connected to clock input terminals of FFs 133A, 133B, 133C, and 133D of the shift register 133 inside the pattern determining portion 130. The pulse PULSE1, which is input from the pattern computing portion 120, is input to the clock input terminals of the FFs 133A, 133B, 133C, and 133D via the terminal 131C.

The terminal 131D is connected to the terminal 121E (refer to FIG. 10) of the pattern computing portion 120 and is connected to a data input terminal of the FF 133A of the shift register 133 inside the pattern determining portion 130. The (M+1) terminals 131D are provided and (M+1) FFs 133A of the shift register 133 are also provided.

The divided results DIV [M:0], which are output from the (M+1) terminals 121E of the pattern computing portion 120 are input, based on a bit, to the data input terminals of the FFs 133A.

The terminal 131E is a terminal which is connected to the binarization processing unit 110 and to which the horizontal synchronization signal HREF2 is input. The terminal 131E is connected to reset terminals R of the FFs 133A, 133B, 133C, and 133D of the shift register 133 via inversion elements 133A1, 133B1, 133C1, and 133D1, respectively, inside the pattern determining portion 130.

The terminal 131F is connected to an output terminal of the logic unit 135 inside the pattern determining portion 130 and an output of the logic unit 135 is output to the output unit 140 and the terminal 105 (refer to FIG. 7).

The pulse generator 132 generates and outputs a pulse PULSE2, based on the data DATA2 [7:0] that is input from the terminal 131A, and the reference clock PCLK2 that is input from the terminal 131B.

When the values ("255" and "0") of the data DATA2 [7:0] are switched, the pulse generator 132 generates the pulse PULSE2 having the H level over the period of the one cycle of the reference clock PCLK2.

The pulse PULSE2 generated by the pulse generator 132 is input to a pulse input terminal PLS of the comparator 134. The pulse PULSE2 is used to reset an output of the comparator 134.

Note that the pulse PULSE2 is the same pulse as the pulse PULSE1 that is generated by the pulse generator 122 of the pattern computing portion 120. Therefore, the pulse generator 132 may not be provided, but the pulse PULSE1 may be input to the pulse input terminal PLS of the comparator 134.

The shift register 133 includes (M+1) FFs 133A, 133B, 133C, and 133D. The terminals 131 are connected to the reset terminals R of the FFs 133A, 133B, 133C, and 133D via the inversion elements 133A1, 133B1, 133C1, and 133D1, respectively. In addition, the terminal 131C is connected to the clock input terminals of the FFs 133A, 133B, 133C, and 133D. The same is true of all of the (M+1) FFs 133A, 133B, 133C, and 133D.

Divided results DIV [M:0] from the (M+1) terminals 131D are input, based on a bit, to the data input terminals of the (M+1) FFs 133A. Data output terminals of the (M+1) FFs 133A are connected to data input terminals of the (M+1) FFs 133B and one type of (M+1) input terminals of four types of (M+1) input terminals of the comparator 134.

In addition, the data output terminals of the (M+1) FFs 133A are connected to the data input terminals of the (M+1) FFs 133B. Data output terminals of the (M+1) FFs 133B are connected to data input terminals of the (M+1) FFs 133C and the one type of (M+1) input terminals of the four types of (M+1) input terminals of the comparator 134.

Similarly, the data output terminals of the (M+1) FFs 133B are connected to the data input terminals of the (M+1) FFs 133C. Data output terminals of the (M+1) FFs 133C are connected to data input terminals of the (M+1) FFs 133D and the one type of (M+1) input terminals of the four types of (M+1) input terminals of the comparator 134.

Data output terminals of the (M+1) FFs 133D are connected to the one type of (M+1) input terminals of the four types of (M+1) input terminals of the comparator 134.

Whenever the pulse PULSE1 is input to the clock input terminals of the FFs 133A, 133B, 133C, and 133D, the shift register 133 stores the divided results DIV [M:0] that are input from the terminal 131D to the FF 133A while reflecting (shifting) the divided results to the next FFs 133B, 133C, and 133D.

Here, the divided results DIV [M:0], which are stored in the data input terminals by the FFs 133A, 133B, 133C, and 133D, respectively, are referred to as a divided result DIV1 [M:0], a divided result DIV2 [M:0], a divided result DIV3 [M:0], and a divided result DIV4 [M:0].

The divided result DIV1 [M:0] is the latest divided result of the four results, and the divided result DIV4 [M:0] is the oldest divided result of the four results.

The pulse input terminal PLS of the comparator 134 is connected to the output terminal of the pulse generator 132, and the four types of (M+1) input terminals thereof are connected, by one type, to the data output terminals of the (M+1) FFs 133A, 133B, 133C, and 133D. In addition, an output terminal of the comparator 134 is connected to an input terminal of the logic unit 135. The comparator 134 is an example of a judgment unit.

The four types of (M+1) input terminals are four by (M+1) input terminals and are divided into four groups so as to be connected to the data output terminals (four by (M+1) data output terminals) of the (M+1) FFs 133A, 133B, 133C, and 133D.

The comparator 134 includes a storage unit 134A that stores a value indicating a permissible range for comparison. The storage unit 134A is an example of a third storage unit. Four values indicating the permissible ranges stored by the storage unit 134A are compared to the divided results DIV1 [M:0], DIV2 [M:0], DIV3 [M:0], and DIV4 [M:0].

For example, in a case where widths of the black pattern 2A, the white pattern 2B, and the black pattern 2C are 1:1:3:1:1 as illustrated in FIG. 6, it is considered as a case where the finder pattern 2 is scanned along any one of arrows A, B, and C illustrated in FIG. 6. The scanning of the finder pattern 2 along any one of the arrows A, B, and C corresponds to a case where ideal scanning is performed.

In such a case, the divided results DIV1 [M:0], DIV2 [M:0], DIV3 [M:0], and DIV4 [M:0] have four values of 1, ⅓, 3, and 1, respectively.

The divided result DIV1 [M:0] has 1 obtained by dividing the width of the black pattern 2A by the width of the white pattern 2B. The divided result DIV2 [M:0] has ⅓ obtained by dividing the width of the white pattern 2B by the width of the black pattern 2C.

The divided result DIV3 [M:0] has 3 obtained by dividing the width of the black pattern 2C by the width of the white pattern 2D. The divided result DIV4 [M:0] has 1 obtained by dividing the width of the white pattern 2B by the width of the black pattern 2A.

Hence, the values indicating the four permissible ranges stored by the storage unit 134A are 1, ⅓, 3, and 1, respectively, and may be values indicating ranges obtained by adding a predetermined permissible value. For example, the permissible value is ±10%. This is because about ±10% does not result in a difficulty in determining a ratio.

Note that, in order for the values indicating the four permissible ranges stored by the storage unit 134A to have the permissible value of ±10%, this is achieved in the following manner. Here, a relationship between the divided result DIV1 [M:0] and one permissible range corresponding to the divided result DIV1 [M:0] is described.

For example, in a case where (M+1) bits are five bits, values of three bits from the uppermost two bits of the divided result DIV1 [M:0] are compared to values of three bits from the uppermost two bits of the values (five bits) indicating the permissible range. When the values are matched, it may be considered that the divided result is within the permissible range. In other words, the lowermost bit or a plurality of bits are truncated, and thereby a permissible range having a permissible value may be realized.

When the pulse PULSE2 that is input to the pulse input terminal PLS from the pulse generator 132 reaches the H level, the comparator 134 resets a comparison result CMPOUT to "0".

The comparator 134 outputs "1" when the four divided results DIV1 [M:0], DIV2 [M:0], DIV3 [M:0], and DIV4 [M:0], which are input from the data output terminals of the FFs 133A, 133B, 133C, and 133D, are all within the permissible ranges of the respective division values. In a case where any one result is not within the permissible range, "0" is output. Then, the comparison result CMPOUT output from the comparator 134 is input to the logic unit 135.

The input terminal of logic unit 135 is connected to the output terminal of the comparator 134 and thus, the comparison result CMPOUT of the comparator 134 is input thereto. The logic unit 135 outputs an output LOGOUT in response to the comparison result CMPOUT.

Here, the comparator 134, the logic unit 135, and the output unit 140 are examples of a transmission unit.

The logic unit 135 outputs an H-level output LOGOUT in a case where the comparison result CMPOUT reaches "1" three times. The logic unit 135 outputs an L-level output LOGOUT in a case where the comparison result CMPOUT does not reach "1" three times (lower than three times).

In the case where the output LOGOUT is at the H level, the output unit 140 transmits data of a binarized image to the MCU 30B. In this case, the LED 14 does not turn on. In the case where the output LOGOUT is at the L level, the output unit 140 does not transmits the data of the binarized image to the MCU 30B. In this case, the LED 14 turns on. In other words, the LED 14 turns on in the case where the output LOGOUT is at the L level. When the LED 14 is configured to turn on based on a signal obtained by inverting the signal level of the output LOGOUT and the output LOGOUT is at the L level, an H-level signal is input to the LED 14, and it is possible to cause the LED 14 to turn on. A voltage value of the H-level signal that is input to the LED 14 may be set to a voltage value equal to or higher than a threshold value with which the LED 14 turns on.

For example, in a case where the image obtained by capturing the QR code 1 (refer to FIG. 4) is read by one row and by one pixel in each row by the raster scanning method, scanning is repeatedly performed in a direction parallel to the arrow A illustrated in FIG. 5. In such a case, when the vicinity of the center of the black pattern 2C of the finder pattern 2 is scanned, the comparison result CMPOUT is "1".

When the comparison result CMPOUT becomes "1" three times, the logic unit 135 outputs the L-level output LOGOUT. It is possible to realize such a logic unit 135 by programming logic of a programmable logic circuit.

In addition, in the case where the comparison result CMPOUT reaches "1" three times, a system in which the logic unit 135 outputs the H-level output LOGOUT is described; however, the number of times is not limited to the three times, and the number of times may be once or more and may be a predetermined number of times with which it is possible to ensure certain reliability to the detection of the finder pattern 2 by the symbol detector 100.

Figure 13:
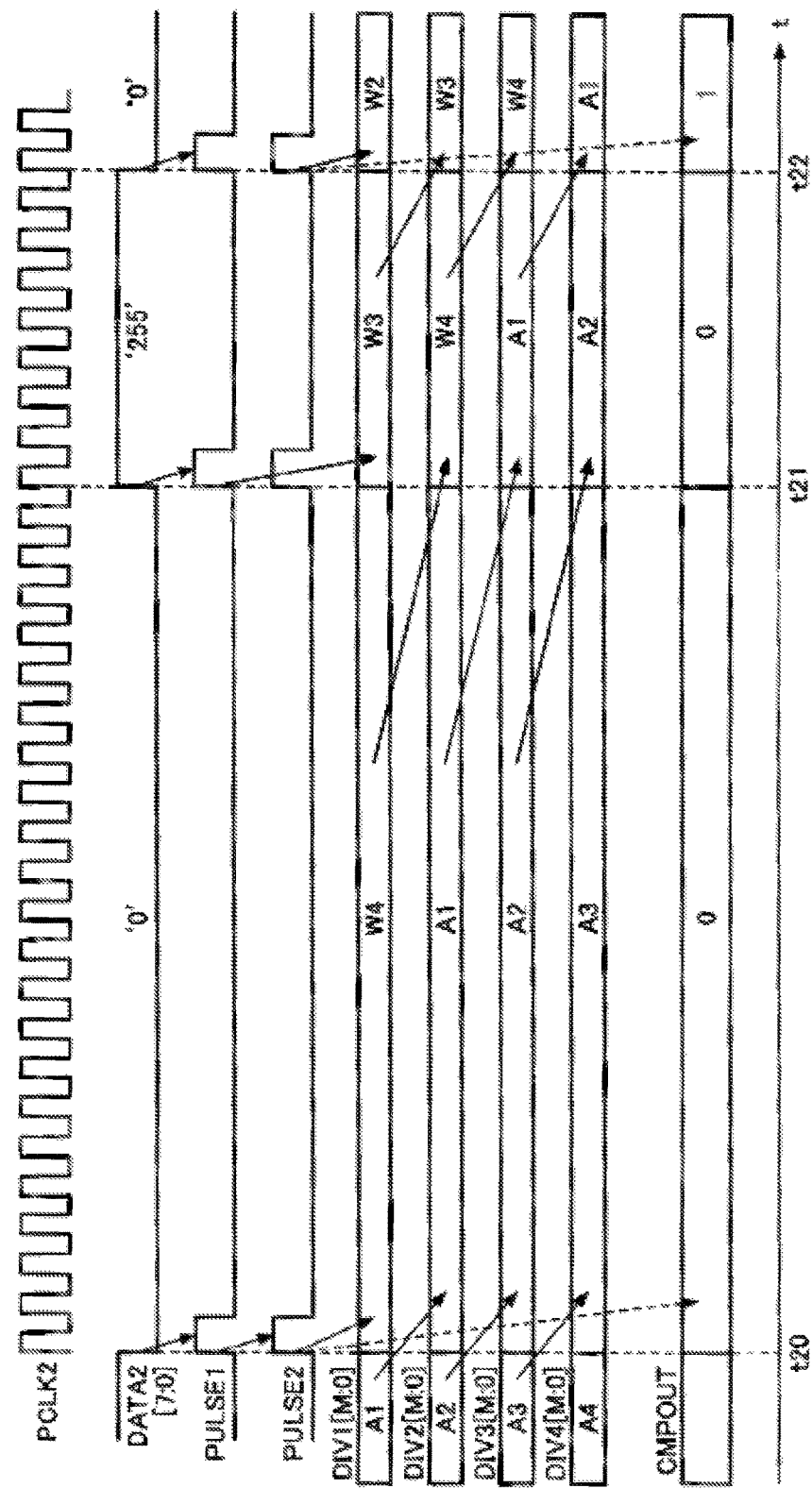
FIG. 13 is a diagram illustrating a timing chart representing an operation performed until the pattern determining portion outputs a comparison result.

FIG. 13 is a diagram illustrating a timing chart representing an operation performed until the pattern determining portion 130 outputs the comparison result CMPOUT. FIG. 13 illustrates the reference clock PCLK2, the data DATA2 [7:0], the pulse PULSE1, the pulse PULSE2, the divided result DIV1 [M:0], the divided result DIV2 [M:0], the divided result DIV3 [M:0], the divided result DIV4 [M:0], and the comparison result CMPOUT. In FIG. 13, the vertical axis represents signal levels of the signals and the horizontal axis represents time.

When the data DATA2 [7:0] is set to "0" from an undefined (xxxx) state at a time point t20, the pulse PULSE1 and the pulse PULSE2 reach the H level over a period of one cycle of the clock PCLK2.

The pulse PULSE1 reaches the H level, thereby, the FFs 133A, 133B, 133C, and 133D shift the values stored in the data input terminals thereof to the data output terminals thereof, and the values are reflected to the divided results DIV1 [M:0], DIV2 [M:0], DIV3 [M:0], and DIV4 [M:0].

Therefore, values A1, A2, and A3 of the divided results DIV1 [M:0], DIV2 [M:0], and DIV3 [M:0] obtained immediately before the time point t20 are shifted to the divided results DIV2 [M:0], DIV3 [M:0], and DIV4 [M:0] at the time point t20. In addition, the value of the divided result DIV1 [M:0] becomes W4 at the time point t20.

In addition, the pulse PULSE2 reaches the H level at the time point t20, and thereby the comparator 134 compares, to the value of the permissible range, the values A1, A2, A3, and A4 of the divided results DIV1 [M:0], DIV2 [M:0], DIV3 [M:0], and DIV4 [M:0] obtained immediately before the time point t20, and the comparator outputs "0" as the comparison result CMPOUT.

When the data DATA2 [7:0] is changed from "0" to "255" at a time point t21, the pulse PULSE1 and the pulse PULSE2 reach the H level over the period of the one cycle of the clock PCLK2.

The pulse PULSE1 reaches the H level, and thereby values W4, A1, and A2 of the divided results DIV1 [M:0], DIV2 [M:0], and DIV3 [M:0] obtained immediately before the time point t21 are shifted to the divided results DIV2 [M:0], DIV3 [M:0], and DIV4 [M:0] at the time point t21. In addition, the value of the divided result DIV1 [M:0] becomes W3 at the time point t21.

In addition, the pulse PULSE2 reaches the H level at the time point t21, and thereby the comparator 134 compares, to the value of the permissible range, values W4, A1, A2, and A3 of the divided results DIV1 [M:0], DIV2 [M:0], DIV3 [M:0], and DIV4 [M:0] obtained immediately before the time point t21, and the comparator outputs "0" as the comparison result CMPOUT.

Further, when the data DATA2 [7:0] is changed from "255" to "0" at a time point t22, the pulse PULSE1 and the pulse PULSE2 reach the H level over the period of the one cycle of the clock PCLK2.

The pulse PULSE1 reaches the H level, and thereby values W3, W4, and A1, of the divided results DIV1 [M:0], DIV2 [M:0], and DIV3 [M:0] obtained immediately before the time point t22 are shifted to the divided results DIV2 [M:0], DIV3 [M:0], and DIV4 [M:0] at the time point t22. In addition, the value of the divided result DIV1 [M:0] becomes W2 at the time point t22.

In addition, the pulse PULSE2 reaches the H level at the time point t22, and thereby the comparator 134 compares, to the value of the permissible range, values W3, W4, A1, and A2 of the divided results DIV1 [M:0], DIV2 [M:0], DIV3 [M:0], and DIV4 [M:0] obtained immediately before the time point t22, and the comparator outputs "1" as the comparison result CMPOUT.

Figure 14:
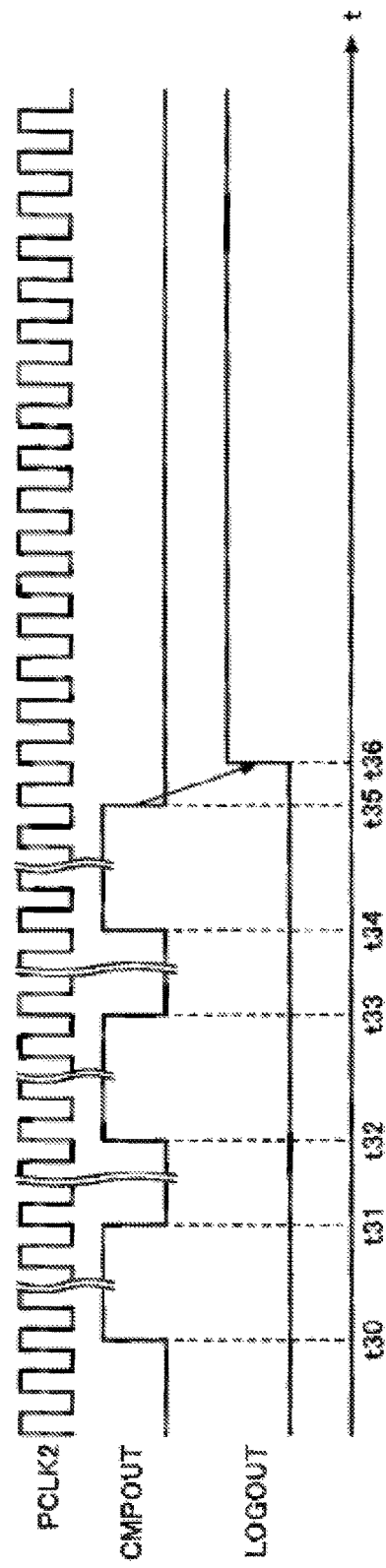
FIG. 14 is a diagram illustrating a timing chart representing an operation of a logic unit.

FIG. 14 is a diagram illustrating a timing chart representing an operation of the logic unit 135. FIG. 14 illustrates the reference clock PCLK2, the comparison result CMPOUT, and the output LOGOUT. In FIG. 14, the vertical axis represents signal levels of the signals and the horizontal axis represents time.

At a time point t30, the comparison result CMPOUT transitions from "0" to "1". In addition, at a time point t31, the comparison result CMPOUT is reset to "0". The comparison result CMPOUT is reset when the pulse PULSE2 that is input from the pulse generator 132 to the pulse input terminal PLS of the comparator 134 reaches the H level.

In addition, at a time point t32, the comparison result CMPOUT also transitions from "0" to "1" and is reset to "0" at a time point t33.

Further, at a time point t34, the comparison result CMPOUT also transitions from "0" to "1" and is reset to "0" at a time point t35.

Thus, when the comparison result CMPOUT becomes "1" three times, the logic unit 135 allows the output LOGOUT to transition from the L level to the H level at a time point t36.

Figure 15:
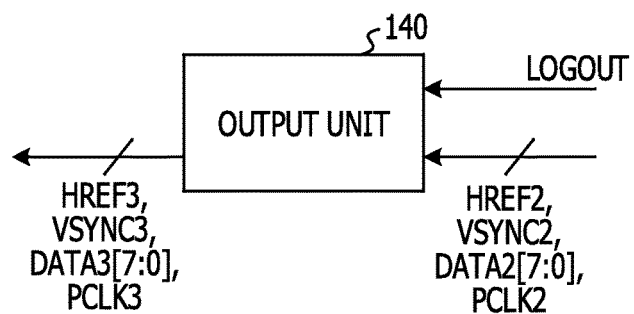
FIG. 15 is a diagram illustrating an output unit.

FIG. 15 is a diagram illustrating the output unit 140.

The output unit 140 includes two input terminals and an output terminal. One input terminal of the output unit 140 is connected to the output terminal of the logic unit 135 (refer to FIG. 12) and the output LOGOUT is input to the one input terminal. The other input terminal of the output unit 140 is connected to the output terminal of the binarization processing unit 110 and the horizontal synchronization signal HREF2, the vertical synchronization signal VSYNC2, the reference clock PCLK2, and the data DATA2 [7:0] are input to the other input terminal.

In addition, the output terminal of the output unit 140 is connected to the DCMI 34B of the MCU 30B (refer to FIGS. 3 and 7).

When the signal level of the output LOGOUT is the H level ("1"), the output unit 140 outputs, to the MCU 30B, the horizontal synchronization signal HREF2, the vertical synchronization signal VSYNC2, the reference clock PCLK2, and the data DATA2 [7:0] as the horizontal signal HREF3, the vertical synchronization signal VSYNC3, the reference clock PCLK3, and the data DATA3 [7:0].

By comparison, when the signal level of the output LOGOUT is the L level ("0"), the output unit 140 does not output, to the MCU 30B, the horizontal synchronization signal HREF2, the vertical synchronization signal VSYNC2, the reference clock PCLK2, and the data DATA2 [7:0]. This is because, when the signal level of the output LOGOUT is the L level ("0"), the finder pattern 2 of the QR code 1 (refer to FIG. 4) is not detected.

FIG. 16 illustrates a truth table representing an operation of the output unit 140.

The truth table in FIG. 16 illustrates a relationship between the signal level of the output LOGOUT of the logic unit 135 (refer to FIG. 12), which is input to the output unit 140, and content of the horizontal signal HREF3, the vertical synchronization signal VSYNC3, the reference clock PCLK3, and the data DATA3 [7:0] which are output from the output unit 140.

As illustrated in FIG. 16, when the output LOGOUT has the H level ("1"), the output unit 140 outputs, to the MCU 30B, the horizontal synchronization signal HREF2, the vertical synchronization signal VSYNC2, the reference clock PCLK2, and the data DATA2 [7:0] as the horizontal signal HREF3, the vertical synchronization signal VSYNC3, the reference clock PCLK3, and the data DATA3 [7:0].

In comparison, when the output LOGOUT has the L level ("0"), the output unit 140 sets, to "0", all of the values of the horizontal signal HREF3, the vertical synchronization signal VSYNC3, the reference clock PCLK3, and the data DATA3 [7:0] and outputs "0" to the MCU 30B.

This means that, when the output LOGOUT has the L level ("0"), the output unit 140 does not output, to the MCU 30B, the horizontal synchronization signal HREF2, the vertical synchronization signal VSYNC2, the reference clock PCLK2, and the data DATA2 [7:0] which are input from the binarization processing unit 110.

Next, an operation example of the symbol detector 100 will be described with reference to sequence diagrams in FIGS. 17 to 20.

FIGS. 17 to 20 are sequence diagrams illustrating the operation example of the symbol detector 100.

Figure 17:
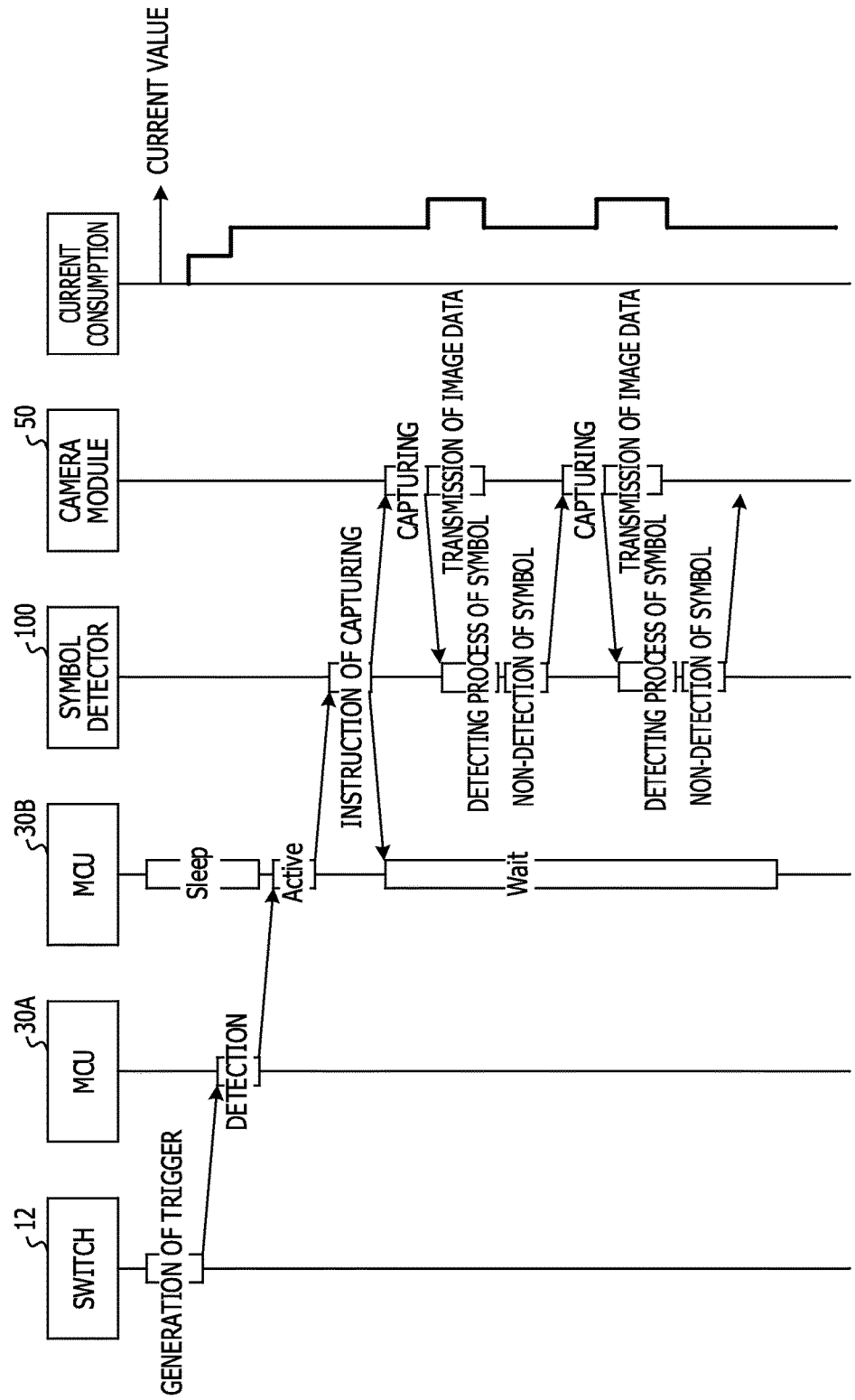
FIG. 17 is a sequence diagram illustrating an operation example of the symbol detector.

FIG. 17 illustrates operations of the switch 12, the MCU 30A, the MCU 30B, the symbol detector 100, and the camera module 50. In addition, total current consumption by the MCU 30A, the MCU 30B, the symbol detector 100, and the camera module 50 is illustrated at the right end of FIG. 17. A time axis is a direction from the upper side toward the lower side in FIG. 17.

As illustrated in FIG. 17, when the switch 12 is pressed, a trigger is generated and is sent to the MCU 30A. At this time, the MCU 30B is in a sleep state, and the MCU 30A, the symbol detector 100, and the camera module 50 are in an OFF state.

When the MCU 30A detects the trigger of the switch 12, the MCU 30A causes the MCU 30B to become active. When the MCU 30B becomes active, the MCU 30B sends an instruction of capturing to the symbol detector 100.

When the symbol detector receives the instruction of capturing, the symbol detector 100 causes the camera module 50 to perform capturing and transmits a wait signal to the MCU 30B. The MCU 30B enters a wait status.

The camera module 50, which receives the instruction of capturing, transmits data of a captured image to the symbol detector 100. Since the camera module 50 transmits the data of the image for each pixel by the raster scanning method, a period from the start of the transmission of the image to the completion of the transmission by the camera module 50 overlaps a part of a period from the start of receiving of the image to the completion of the receiving by the symbol detector 100.

The symbol detector 100 reads the image, which is transmitted for each pixel from the camera module 50, and performs a detecting process of the finder pattern 2. Here, when the finder pattern 2 results in being undetected (non-detection of symbol), the camera module 50 performs capturing of a second frame and transmits data of the captured image to the symbol detector 100.

The symbol detector 100 reads the image that is transmitted for each pixel from the camera module 50, and performs the detecting process of the finder pattern 2. Here, when the finder pattern 2 again results in being undetected (non-detection of symbol), the camera module 50 performs capturing of a third frame.

Although the detecting process of the finder pattern 2 in this manner brings about the non-detection of the symbol, the MCU 30B is in the sleep state, and the current consumption is reduced because the detecting process of the finder pattern 2 is performed by the symbol detector 100.

Figure 18:
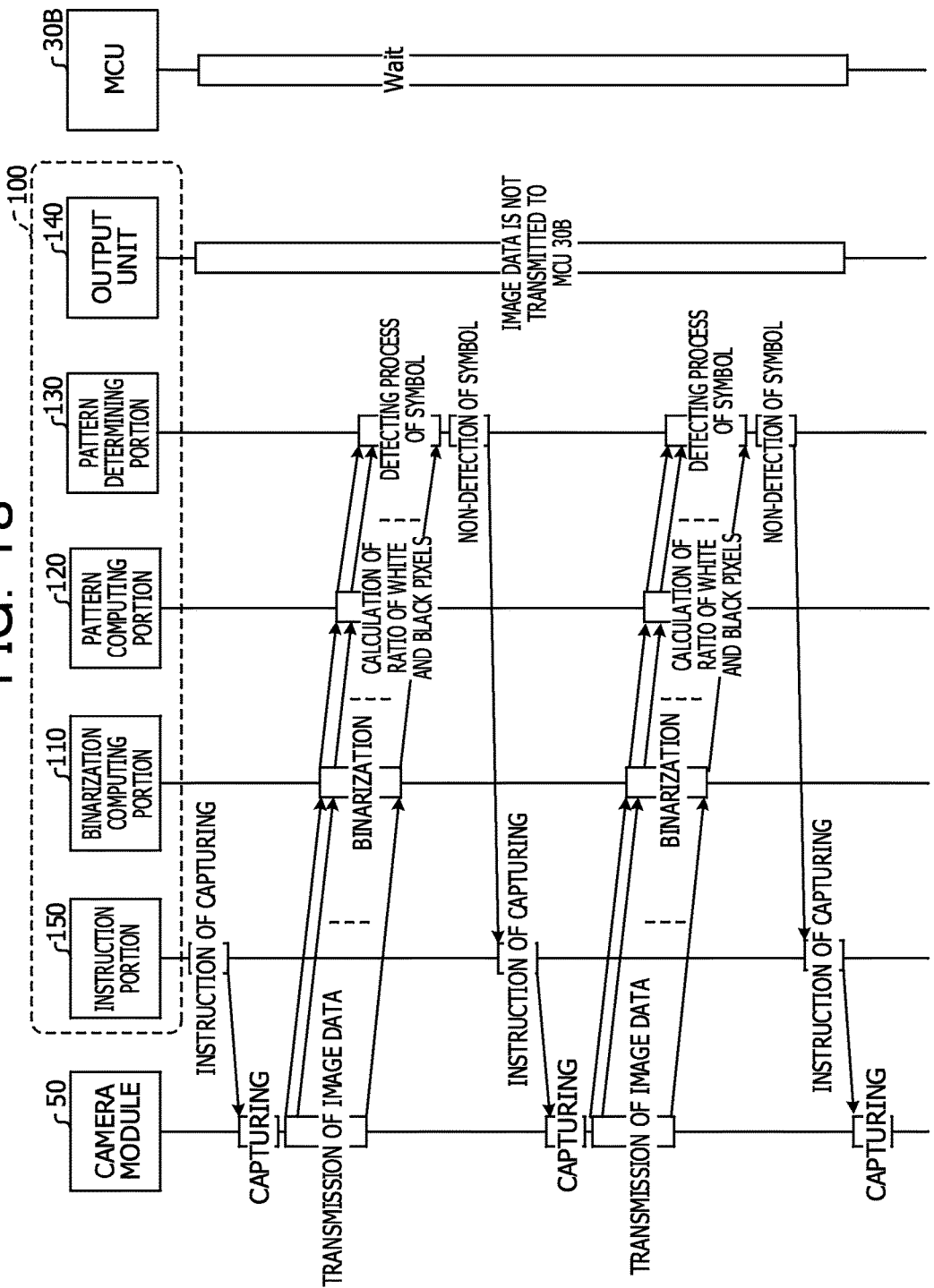
FIG. 18 is another sequence diagram illustrating an operation example of the symbol detector.

In addition, FIG. 18 illustrates internal processing of the symbol detector 100 in the sequence illustrated in FIG. 17 and operations of the MCU 30B and the camera module 50. The sequence illustrated in FIG. 18 starts from the time when the symbol detector 100, which receives the instruction of capturing from the MCU 30B, transmits the instruction of capturing to the camera module 50 in FIG. 17. Note that the MCU 30B is maintained in the wait state in the sequence illustrated in FIG. 18.

FIG. 18 illustrates the binarization processing unit 110, the pattern computing portion 120, the pattern determining portion 130, the output unit 140, and the instruction portion 150 which are internal components of the symbol detector 100.

First, when the instruction portion 150 instructs capturing to the camera module 50, the camera module 50 performs capturing and transmits the data of the captured image to the symbol detector 100.

The binarization processing unit 110 binarizes the image, which is transmitted for each pixel from the camera module 50, and sends the binarized image to the pattern computing portion 120. The pattern computing portion 120 calculates a ratio of the number of consecutive white pixels and the number of consecutive black pixels and sends the calculated result to the pattern determining portion 130.

When the detecting process of the finder pattern 2 ends up the non-detection of the symbol, the pattern determining portion 130 causes the instruction portion 150 to issue the instruction of capturing to the camera module 50. The camera module 50 performs capturing and transmits data of the captured image for each pixel to the symbol detector 100.

The binarization processing unit 110 binarizes the image, which is transmitted for each pixel from the camera module 50, and sends the binarized image to the pattern computing portion 120. The pattern computing portion 120 calculates the ratio of the number of consecutive white pixels and the number of consecutive black pixels, and sends the calculated result to the pattern determining portion 130.

When the detecting process of the finder pattern 2 ends up the non-detection of the symbol, the pattern determining portion 130 causes the instruction portion 150 to issue the instruction of capturing to the camera module 50.

Thus, when the finder pattern 2 is not detected (non-detection of symbol), the output unit 140 does not transmit data of an image to the MCU 30B.

Next, a sequence obtained in a case of success of the detection of the finder pattern 2 will be described with reference to FIGS. 19 and 20.

In FIG. 19, description is provided from the time after data of an image is transmitted to the symbol detector 100 from the camera module 50. An operation performed after the switch 12 is pressed until the data of the image is transmitted to the symbol detector 100 is the same as the operation illustrated in FIG. 17.

The symbol detector 100 reads the image, which is transmitted for each pixel from the camera module 50, and performs the detecting process of the finder pattern 2. Here, when the finder pattern 2 results in being undetected (non-detection of symbol), the camera module 50 performs capturing of a second frame and transmits data of the captured image to the symbol detector 100.

The symbol detector 100 reads the image that is transmitted for each pixel from the camera module 50, and performs the detecting process of the finder pattern 2. Here, when the finder pattern 2 is detected, the symbol detector 100 causes the MCU 30B to become active and causes the camera module 50 to perform capturing.

The camera module 50 transmits data of the captured image to the symbol detector 100, and the symbol detector 100 binarizes the image and sends the binarized image to the MCU 30B.

As a result, the MCU 30B performs image processing to the binarized image and reads data written in the data region 5 of the QR code 1 (refer to FIG. 4). When the reading of the data succeeds, the MCU 30B notifies the MCU 30A that the reading succeeds.

Thus, in the case where the finder pattern 2 is detected, the MCU 30B performs the image processing to the data region 5 of the QR code 1 (refer to FIG. 4). Therefore, the current consumption is increased while the MCU 30B performs the image processing.

However, when the finder pattern 2 is not detected by the symbol detector 100 and thus, the MCU 30B does not perform the image processing, the current consumption is the same as that illustrated in FIG. 17 and it is possible to reduce the power consumption.

In addition, FIG. 20 illustrates internal processing of the symbol detector 100 in the sequence illustrated in FIG. 19 and operations of the MCU 30B and the camera module 50. The sequence illustrated in FIG. 20 starts from the time when the symbol detector 100, which receives the instruction of capturing from the MCU 30B, transmits the instruction of capturing to the camera module 50 in FIG. 19. Note that the MCU 30B is first maintained in the wait state in the sequence illustrated in FIG. 20.

FIG. 20 illustrates the binarization processing unit 110, the pattern computing portion 120, the pattern determining portion 130, the output unit 140, and the instruction portion 150 which are the internal components of the symbol detector 100.

First, when the instruction portion 150 instructs capturing to the camera module 50, the camera module 50 performs capturing and transmits the data of the captured image to the symbol detector 100.

The binarization processing unit 110 binarizes the image, which is transmitted for each pixel from the camera module 50, and sends the binarized image to the pattern computing portion 120. The pattern computing portion 120 calculates a ratio of the number of consecutive white pixels and the number of consecutive black pixels and sends the calculated result to the pattern determining portion 130.

When the detecting process of the finder pattern 2 is performed and the finder pattern 2 is detected, the pattern determining portion 130 causes the instruction portion 150 to issue the instruction of capturing to the camera module 50. The camera module 50 performs capturing and transmits data of the captured image to the symbol detector 100.

The binarization processing unit 110 binarizes the image, which is transmitted for each pixel from the camera module 50, and sends the binarized image to the output unit 140. The symbol detector 100 causes, by the output unit 140, the camera module 50 to capture an image in the next frame of the image used in detecting the finder pattern 2, and the image is transmitted to the MCU 30B through the output unit 140 after the image is binarized in the binarization processing unit 110.

Thus, when the finder pattern 2 is detected, the output unit 140 transmits the data of the image to the MCU 30B.

Figure 21A:
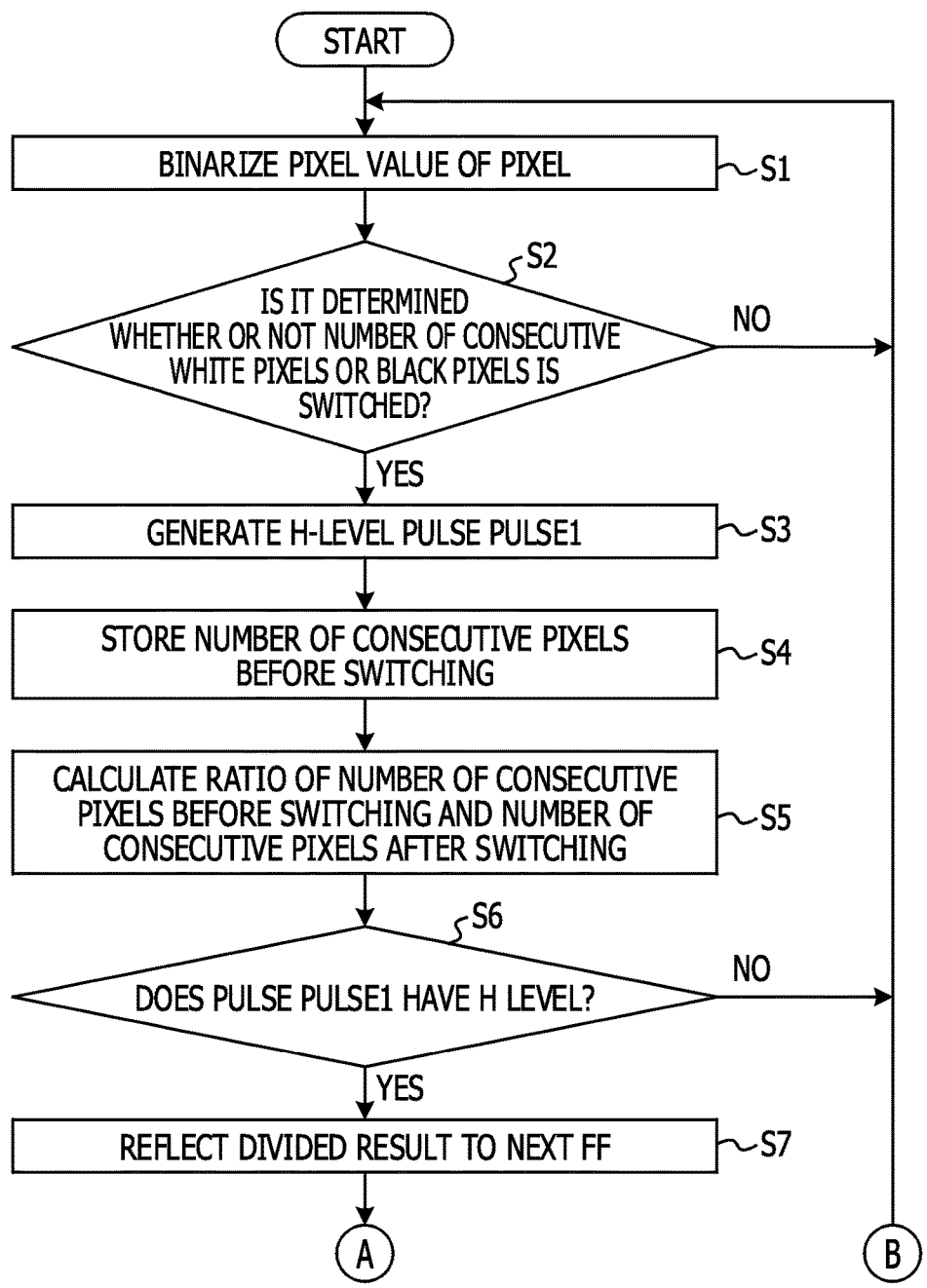

FIGS. 21A and 21B are a flowchart illustrating a process performed by the symbol detector 100. The symbol detector 100 starts processing (start) when a mode of reading the image is started.

The symbol detector 100 binarizes a pixel value of each pixel (Step S1). The binarization processing unit 110 executes the process in Step S1.

The symbol detector 100 judges whether or not the number of consecutive white pixels and the number of consecutive black pixels are switched (Step S2). The pattern computing portion 120 executes the process in Step S2.

The symbol detector 100 judges that the number of consecutive white pixels and the number of consecutive black pixels are switched (S2: YES), H-level pulse PULSE1 is generated (Step S3). The pattern computing portion 120 executes the process in Step S3. More specifically, the symbol detector 100 judges whether or not the count value CNT1 [N:0] and the count value CNT2 [N:0] are switched.

The symbol detector 100 stores, in the FF 124B, the number of consecutive pixels obtained before the switching (Step S4). The pattern computing portion 120 executes the process in Step S4.

The symbol detector 100 calculates a ratio of the number of consecutive pixels obtained before the switching and the number of consecutive pixels obtained after the switching (Step S5). The pattern computing portion 120 executes the process in Step S5. The calculated ratio is output as the divided result DIV [M:0] from the pattern computing portion 120.

The symbol detector 100 judges whether or not the pulse PULSE1 reaches the H level (Step S6). The pattern determining portion 130 executes the process in Step S6.

When the symbol detector 100 judges that the pulse PULSE1 reaches the H level (S6: YES), the divided results DIV [M:0] stored by the FF 133A, the FF 133B, and the FF 133C are reflected to the next the FF 133B, the FF 133C, and the FF 133D (Step S7).

The pattern determining portion 130 executes the process in Step S7. More specifically, whenever the pulse PULSE1 is input to the clock input terminals of the FFs 133A, 133B, 133C, and 133D, the shift register 133 stores the divided results DIV [M:0] that is input from the terminal 131D to the FF 133A while reflecting the divided result to the next FFs 133B, 133C, and 133D. Note that the latest divided result DIV [M:0] is input to the FF 133A.

In this manner, the FFs 133A, 133B, 133C, and 133D store four divided results DIV1 [M:0], DIV2 [M:0], DIV3 [M:0], and DIV4 [M:0], respectively. In addition, the four divided results DIV1 [M:0], DIV2 [M:0], DIV3 [M:0], and DIV4 [M:0] are input to the comparator 134 through the process in Step S7.

The symbol detector 100 judges whether or not the four divided results DIV1 [M:0], DIV2 [M:0], DIV3 [M:0], and DIV4 [M:0] are all within the permissible ranges of the respective division values (Step S8). The pattern determining portion 130 executes the process in Step S8. More specifically, the comparator 134 judges whether or not the four divided results DIV1 [M:0], DIV2 [M:0], DIV3 [M:0], and DIV4 [M:0], which are into from the data output terminals of the FFs 133A, 133B, 133C, and 133D are all within the permissible ranges of the respective division values.

When the symbol detector 100 judges that the four divided results DIV1 [M:0], DIV2 [M:0], DIV3 [M:0], and DIV4 [M:0] are all within the permissible ranges of the respective division values (S8: YES), the symbol detector 100 outputs "1" (Step S9). The pattern determining portion 130 executes the process in Step S9.

In the case where any one of the four divided results DIV1 [M:0], DIV2 [M:0], DIV3 [M:0], and DIV4 [M:0] is not within the permissible ranges (S8: NO), the symbol detector 100 outputs "0" (Step S10). The pattern determining portion 130 executes the process in Step S10.

The symbol detector 100 judges whether or not the comparison result CMPOUT reaches "1" three times (Step S11). The pattern determining portion 130 executes the process in Step S11. More specifically, the logic unit 135 judges whether or not the comparison result CMPOUT reaches "1" three times.

When the symbol detector 100 judges that the comparison result CMPOUT reaches "1" three times (S11: YES), the symbol detector outputs the H-level output LOGOUT (Step S12). The pattern determining portion 130 executes the process in Step S12. More specifically, the logic unit 135 outputs the H-level output LOGOUT.

Subsequently, in the symbol detector 100, the output unit 140 transmits the data of the image to the MCU 30B (Step S13). The output unit 140 executes the process in Step S12. More specifically, the output unit 140 outputs, to the MCU 30B, the horizontal synchronization signal HREF2, the vertical synchronization signal VSYNC2, the reference clock PCLK2, and the data DATA2 [7:0] as the horizontal signal HREF3, the vertical synchronization signal VSYNC3, the reference clock PCLK3, and the data DATA3 [7:0], respectively.

By comparison, when the symbol detector 100 judges that the comparison result CMPOUT does not reach "1" three times (S13: NO), the L-level output LOGOUT is output (Step S14). The pattern determining portion 130 executes the process in Step S11. More specifically, the logic unit 135 outputs the L-level output LOGOUT.

Subsequently, the symbol detector 100 does not transmit data of the image to the MCU 30B (Step S15). The output unit 140 executes the process in Step S12. More specifically, the output unit 140 does not output (transmit), to the MCU 30B, the horizontal synchronization signal HREF2, the vertical synchronization signal VSYNC2, the reference clock PCLK2, and the data DATA2 [7:0]. As a result, the symbol detector 100 causes the LED 14 to turn on, and thus a user is notified that the data DATA2 [7:0] is not transmitted to the MCU 30B.

When the processes in Step S13 or Step S15 are ended, the symbol detector 100 judges whether or not the mode of reading the image is ended (Step S16).

When the mode of reading the image is not ended (S16: NO), the symbol detector 100 returns the flow to Step S1.

When the mode of reading the image is ended (S16: YES), the symbol detector 100 ends a series of the processes (END).

Here, a comparative example is described with reference to FIGS. 22 to 24.

Figure 22:
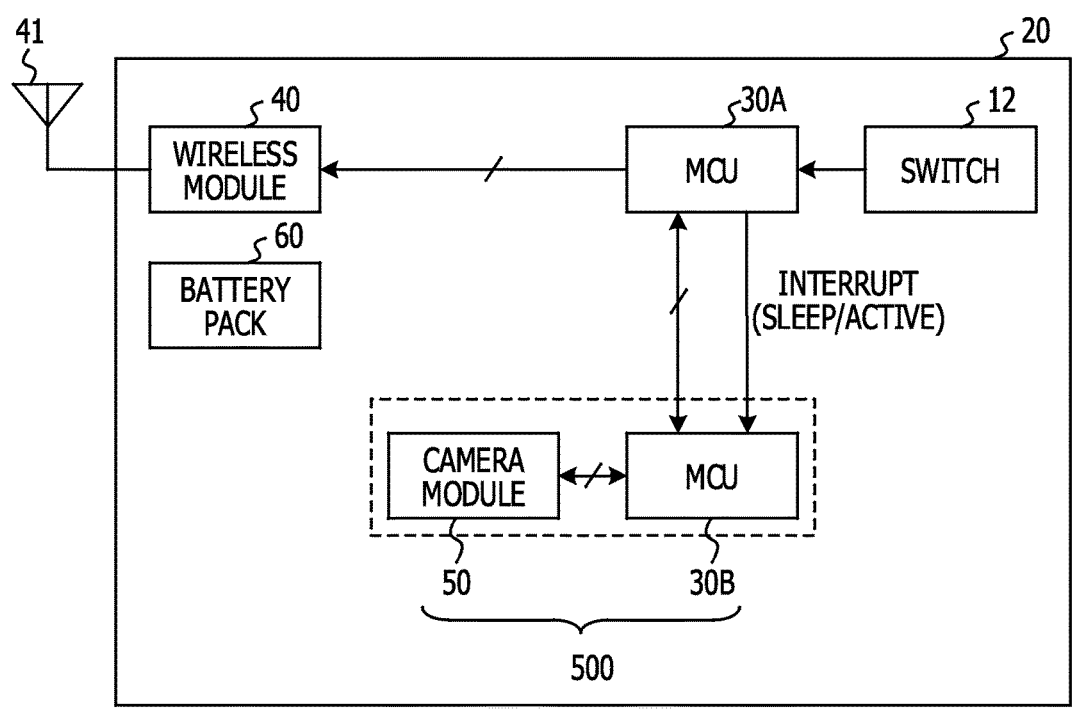
FIG. 22 is a diagram illustrating an internal configuration of a barcode reader of a comparative example.

FIG. 22 is a diagram illustrating an internal configuration of a barcode reader 10A of the comparative example.

The barcode reader 10A has a configuration in which the MCU 30B and the camera module 50 are directly connected, with the symbol detector 100 removed from the barcode reader 10 of the embodiment illustrated in FIG. 2. In the barcode reader 10A of the comparative example, the output of the finder pattern 2 is realized by the MCU 30B performing the image processing. The other components are the same as those of the barcode reader 10 of the embodiment illustrated in FIG. 2.

Figure 23:
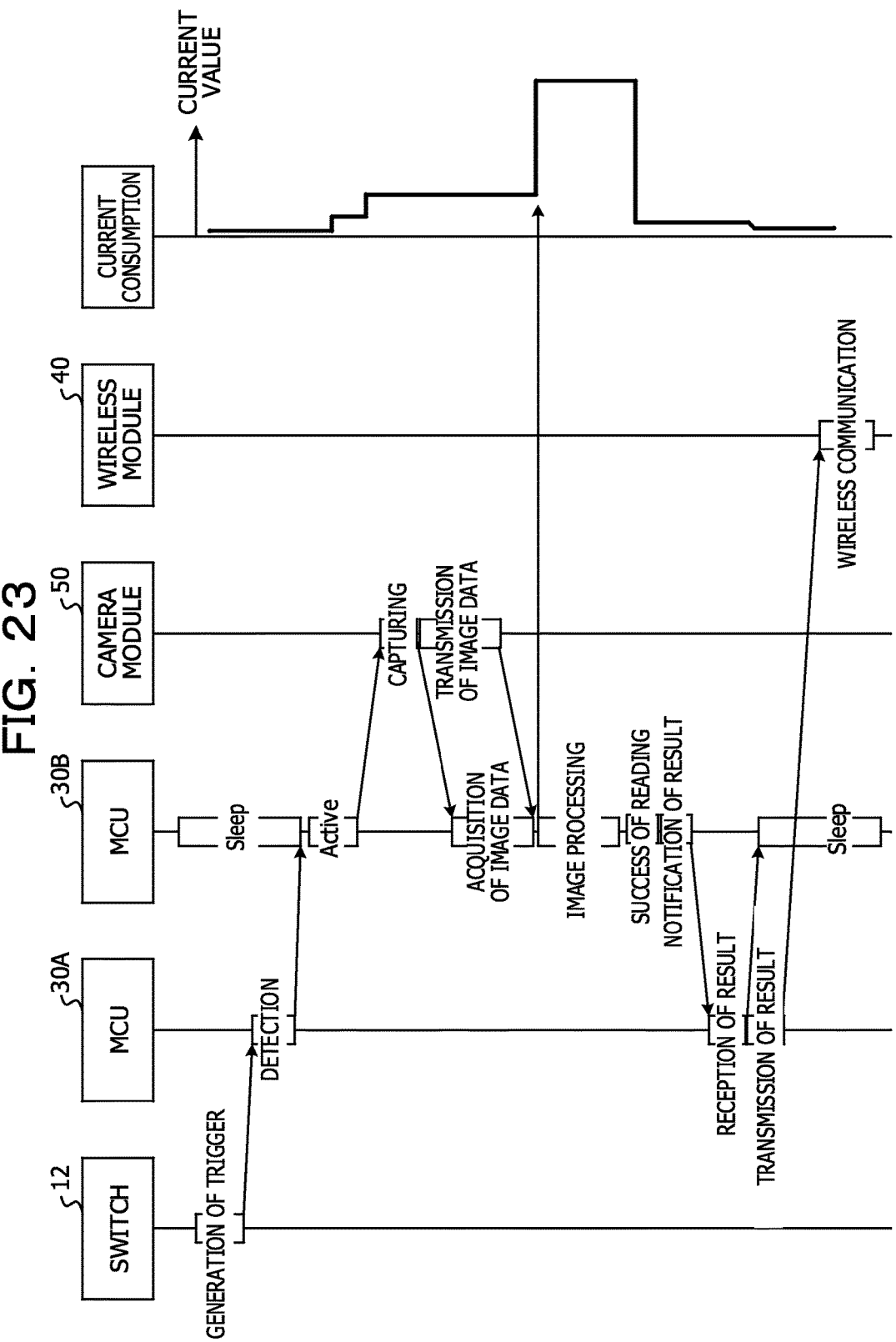
FIG. 23 is a sequence diagram illustrating an operation example of the barcode reader of the comparative example.

FIGS. 23 and 24 are sequence diagrams illustrating an operation example of the barcode reader 10A of the comparative example.

FIG. 23 illustrates operations of the switch 12, the MCU 30A, the MCU 30B, the camera module 50, and the wireless module 40. In addition, total current consumption by the MCU 30A, the MCU 30B, and the camera module 50 is illustrated at the right end of FIG. 23. A time axis is a direction from the upper side toward the lower side in FIG. 23.

As illustrated in FIG. 23, when the switch 12 is pressed, a trigger is generated. At this time, the MCU 30B is in the sleep state, and the MCU 30A and the camera module 50 are in the OFF state.

When the MCU 30A detects the trigger of the switch 12, the MCU 30B is caused to become active by the MCU 30A. When the MCU 30B becomes active, the MCU 30B causes the camera module 50 to perform capturing.

The camera module 50, which receives the instruction of capturing, transmits data of a captured image to the MCU 30B.

The MCU 30B performs the image processing on the image transmitted for each pixel form the camera module 50, recognizes the finder pattern 2 of the QR code 1 (refer to FIG. 4), and reads the data in the data region 5. Then, when the data in the QR code 1 is read, the MCU 30B notifies the MCU 30A of the read data as a success result.

When the MCU 30A receives the success result from the MCU 30B, the MCU 30A transmits the success result to the wireless module 40. In this manner, the data in the QR code 1 is transmitted to the wireless module 40.

Since recognition of the finder pattern 2 and the reading of the data region 5 are performed while the MCU 30B uses an internal memory, when the MCU 30B recognizes the finder pattern 2 and performs the image processing so as to read the data in the data region 5, the current consumption is increased. The current consumption is increased, compared to the barcode reader 10 of the embodiment, because the current consumption is illustrated in the same sequence as that in FIGS. 17 and 19.

Next, a sequence performed in a case of failure of reading of the data in the QR code 1 is described with reference to FIG. 24.

In FIG. 24, description is provided from the time after the MCU 30B becomes active. An operation after the switch 12 is pressed until the MCU 30B becomes active is the same as the operation illustrated in FIG. 23.

The camera module 50 captures the QR code 1 and transmits the data of the captured image to the MCU 30B. The MCU 30B acquires the image, which is transmitted for each pixel from the camera module 50, and performs the recognition of the finder pattern 2 and the reading of the data in the data region 5.

Here, suppose that the MCU 30B fails in recognizing the finder pattern 2 or reading the data in the data region 5. The MCU 30B again causes the camera module 50 to perform capturing, acquires the image transmitted from the camera module 50, and performs the recognition of the finder pattern 2 and the reading of the data in the data region 5.

Then, suppose that the MCU 30B again fails in recognizing the finder pattern 2 or reading the data in the data region 5.

The case where the MCU 30B fails in recognizing the finder pattern 2 includes, for example, a case where the image captured by the camera module 50 is out of focus, a case where the entire finder pattern 2 is not completely contained in the image captured by the camera module 50, or the like.

In addition, the case where the MCU 30B fails in reading the data in the data region 5 includes, for example, the case where the image captured by the camera module 50 is out of focus, a case where the entire data region 5 is not completely contained in the image captured by the camera module 50, or the like.

Thus, when the reading of the QR code 1 fails in the barcode reader 10A of the comparative example, the current consumption is increased whenever the MCU 30B performs the image processing.

The increase in such current consumption is remarkable, compared to the current consumption illustrated in the sequence diagram (FIGS. 17 and 19) of the barcode reader 10 of the embodiment.

When the current consumption illustrated in FIGS. 23 and 24 is compared to the current consumption illustrated in FIGS. 17 and 19, the barcode reader 10 of the embodiment uses the symbol detector 100, and thereby it is possible to recognize a significant reduction in the power consumption, compared to the barcode reader 10A of the comparative example.

As described above, in the barcode reader 10 of the embodiment, the symbol detector 100 detects the finder pattern 2 and outputs, to the MCU 30B, first, the horizontal synchronization signal HREF3, the vertical synchronization signal VSYNC3, the reference clock PCLK3, and the data DATA3 [7:0] when the comparison result CMPOUT of the comparator 134 becomes 1 three times.

When the comparison result CMPOUT of the comparator 134 becomes 1 three times, it is considered that scanning through the center of the black pattern 2C positioned at the center of the finder pattern 2 of the QR code 1 (refer to FIG. 4) is consecutively performed three times.

When the scanning through the center of the black pattern 2C positioned at the center of the finder pattern 2 is consecutively performed three times, it is considered that the symbol detector 100 detects the finder pattern 2.

When the symbol detector 100 detects the finder pattern 2 in this manner, the symbol detector 100 outputs, to the MCU 30B, the horizontal synchronization signal HREF3, the vertical synchronization signal VSYNC3, the reference clock PCLK3, and the data DATA3 [7:0].

In other words, when the symbol detector 100 does not detect the finder pattern 2, the symbol detector 100 does not output, to the MCU 30B, the horizontal synchronization signal HREF3, the vertical synchronization signal VSYNC3, the reference clock PCLK3, and the data DATA3 [7:0].

The symbol detector 100 is used, thereby making it possible to reduce the power consumption used when the QR code 1 (refer to FIG. 4) is read in the barcode reader 10.

The symbol detector 100 is realized by the programmable logic circuit such as the FPGA or the computation unit. The symbol detector 100 only stores the data of the image to the FFs 124A and 124B, and only stores the divided results DIV1 [M:0] to DIV4 [M:0] in the FFs 133A to 133D such that the power consumption is significantly reduced, compared to the MCU 30B that stores the data of the image in a memory or the like.

As long as the symbol detector 100 is caused to detect the finder pattern 2 in the QR code 1 (refer to FIG. 4) and the finder pattern 2 is not detected, the horizontal synchronization signal HREF3, the vertical synchronization signal VSYNC3, the reference clock PCLK3, and the data DATA3 [7:0] are not transmitted to the MCU 30B.

The horizontal synchronization signal HREF3, the vertical synchronization signal VSYNC3, the reference clock PCLK3, and the data DATA3 [7:0] are transmitted to the MCU 30B only when the symbol detector 100 detects the finder pattern 2 in the QR code 1.

Hence, according to the embodiment, it is possible to provide the symbol detector 100 in which the power consumption is reduced, and an image processing device 500.

Note that a reading method of the QR code 1 as an example of the two-dimensional barcode is described above; however, the symbol that the symbol detector 100 detects is not limited to the two-dimensional barcode, but may include a symbol contained in a one-dimensional barcode. In addition, the detection target is not limited to the barcode, and it is possible for the symbol detector 100 to detect a symbol having a first pattern with a first color and a second pattern with a second color which have a predetermined ratio of widths.

In addition, in the case where the finder pattern 2 in the QR code 1 is read through the center of the black pattern 2C, an example, in which the ratio of the widths of the black pattern 2A, the white pattern 2B, the black pattern 2C, the white pattern 2B, and the black pattern 2A is 1:1:3:1:1, is described above. Therefore, an example, in which the shift register 133 includes the four FFs 133A to 133D and the four ratios (DIV1 [M:0], DIV2 [M:0], DIV3 [M:0], and DIV4 [M:0]) are compared to the values indicating the four permissible ranges, which are stored in the storage unit 134A of the comparator 134, is described.

In a case where the first pattern and the second pattern of the symbol detected by the symbol detector 100 have a ratio other than the ratio described above, the configurations of the shift register 133 and the comparator 134 may be appropriately modified. In addition, the components other than the shift register 133 and the comparator 134 may also be appropriately modified in a case where modification is desired to be performed according to a symbol as the detection target.

In addition, instead of the comparison, by the comparator 134, of the four ratios (DIV1 [M:0], DIV2 [M:0], DIV3 [M:0], and DIV4 [M:0]) to the values indicating the four permissible ranges which are stored in the storage unit 134A of the comparator 134, the following method may be employed. The storage unit 134A may store values indicating four ratios, instead of the four permissible ranges, and it may be judged whether or not a difference between the four ratios output from the FFs 133A to 133D and the four ratios stored in the storage unit 134A is equal to or lower than a predetermined value.

In addition, the example of the wireless type of barcode reader 10 is described; however, the barcode reader 10 may be a type in which the battery pack 60 is not included and power is supplied through a power code. This is because it is preferable that the power consumption of the barcode reader 10 is reduced even in a case where power supply is received through the power code.

As described above, the symbol detector, the image processing device, and the symbol detecting method of an exemplary embodiment are described; however, the embodiment is not limited to the specifically described embodiment, and it is possible to perform various modifications or alterations without departing from the scope of the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A symbol detector coupled to an image capture device configured to capture an image and a data reader configured to read data included in the image, the symbol detector comprising:
   a processor configured to read the image captured by the image capture device in a uniaxial direction and output a first pixel value or a second pixel value obtained by binarization of a pixel value of each pixel of the image, the image including a symbol having a first pattern with a first color and a second pattern with a second color, the first pattern having a predetermined ratio to the second pattern;
   a calculation circuit configured to calculate a second ratio of a first consecutive value and a second consecutive value obtained before and after the first consecutive value in a case where the first consecutive value and the second consecutive value are switched alternately, the first consecutive value indicating a number of consecutive first pixel values, and the second consecutive value indicating a number of consecutive second pixel values; and
   a transmitter configured to transmit the image including an alignment pattern and the data to the data reader in a case where a difference between the calculated second ratio and a first ratio is equal to or lower than a predetermined value, where the transmitter does not transmit the image to the data reader in a case where the difference is higher than the predetermined value, wherein the data reader is configured to:
  detect the alignment pattern included in the image transmitted from the transmitter,
  determine a position of the alignment pattern in the image, and
  read the data included in the image by utilizing the position of the alignment pattern.

2. The symbol detector according to claim 1, further comprising:
  a first storage configured to store alternatively the first consecutive value and the second consecutive value in a time series;
  a second storage configured to read, from the first storage, and store the first consecutive value or the second consecutive value stored in the first storage before the switching; and
  a third storage configured to store a value of the first ratio,
  wherein the calculation circuit calculates the second ratio based on the value stored in the first storage and the value stored in the second storage.

3. The symbol detector according to claim 2,
  wherein the first storage and the second storage store the first consecutive value and the second consecutive value based on the pixel value obtained by the binarization of an image in a first frame of images including the image,
  wherein the calculation circuit calculates the second ratio based on the first consecutive value and the second consecutive value corresponding to the image in the first frame, the first consecutive value and second consecutive values being stored in the first storage and the second storage, and
  wherein the transmitter transmits an image in a next second frame of the first frame of the images to the data reader.

4. The symbol detector according to claim 2,
  wherein the third storage stores a value that indicates a predetermined permissible range so as to set a permissible range to the first ratio, and
  wherein the transmitter transmits the image to the data reader in a case where the calculated second ratio is within the predetermined permissible range stored in the third storage, and stops the transmission of the image in a case where the second ratio is out of the predetermined permissible range.

5. The symbol detector according to claim 4,
  wherein the transmitter includes
    a judgment unit that judges whether or not the calculated second ratio is within the predetermined permissible range stored in the third storage, and
    an output unit that transmits the image to the data reader in a case where the judgment unit judges that the second ratio is within the predetermined permissible range, and stops the transmission of the image in a case where the judgment unit judges that the second ratio is out of the predetermined permissible range.

6. The symbol detector according to claim 5,
  wherein the transmitter further includes
    a logic unit that validates the transmission of the image to the data reader by the output unit in a case where the judgment unit judges a predetermined number of times that the second ratio is within the predetermined permissible range, and invalidates the transmission of the image to the data reader by the output unit in a case where the judgment unit judges less times than the predetermined number of times that the second ratio is within the predetermined permissible range.

7. An image processing device comprising:
  an image capture device configured to capture an image including a symbol having a first pattern with a first color and a second pattern with a second color, the first pattern has a predetermined ratio to the second pattern;
  a processor configured to read the image in a uniaxial direction and output a first pixel value or a second pixel value obtained by binarization of a pixel value of each pixel of the image;
  a calculation circuit configured to calculate a second ratio of a first consecutive value and a second consecutive value obtained before and after the first consecutive value in a case where the first consecutive value and the second consecutive value are switched alternately, the first consecutive value indicating a number of consecutive first pixel values, the second consecutive value indicating a number of consecutive second pixel values;
  a transmitter configured to transmit the image including an alignment pattern and data in a case where a difference between the calculated second ratio and a first ratio is equal to or lower than a predetermined value, where the transmitter does not transmit the image in a case where the difference is higher than the predetermined value; and
  a data reader configured to:
    detect the alignment pattern included in the image transmitted from the transmitter,
    determine a position of the alignment pattern in the image, and
    read the data included in the image by utilizing the position of the alignment pattern.

8. A symbol detecting method to transmit an image including a symbol having a first pattern with a first color and a second pattern with a second color, the first pattern has a predetermined ratio to the second pattern, comprising:
  reading the image in a uniaxial direction;
  outputting a first pixel value or a second pixel value obtained by binarization of a pixel value of each pixel of the image;
  calculating a second ratio of a first consecutive value and a second consecutive value obtained before and after the first consecutive value in a case where the first consecutive value and the second consecutive value are switched alternately, the first consecutive value indicating a number of consecutive first pixel values, the second consecutive value indicating a number of consecutive second pixel values;
  transmitting the image including an alignment pattern and data to a data reader in a case where a difference between the calculated second ratio and a first ratio is equal to or lower than a predetermined value, the data reader reading data included in the image, where the image is not transmitted the difference is higher than the predetermined value;
  detecting, by the data reader, the alignment pattern included in the image transmitted from the transmitter;
  determining, by the data reader, a position of the alignment pattern in the image; and
  reading, by the data reader, the data included in the image by utilizing the position of the alignment pattern.

* * * * *